US012392510B2

(12) United States Patent
Pongiluppi et al.

(10) Patent No.: US 12,392,510 B2
(45) Date of Patent: Aug. 19, 2025

(54) MOBILE CLEAN ROOM

(71) Applicant: Sorin Group Italia S.r.l., Milan (IT)

(72) Inventors: Nino Pongiluppi, Mirandola (IT); Marco Ferri, Piacenza (IT); Monica Paganini, Sermide e Felonica (IT); Susanna Golinelli, Mirandola (IT); Gloria Ferioli, Poggio Rusco (IT); Stefano Duò, Canda (IT); Michela Paolini, Carpi (IT)

(73) Assignee: Sorin Group Italia S.r.l., Milan (IT)

( * ) Notice: Subject to any disclaimer, the term of this patent is extended or adjusted under 35 U.S.C. 154(b) by 815 days.

(21) Appl. No.: 17/706,359

(22) Filed: Mar. 28, 2022

(65) Prior Publication Data

US 2023/0304681 A1 Sep. 28, 2023

(51) Int. Cl.

*F24F 3/167* (2021.01)
*E04B 1/348* (2006.01)
*F24F 11/52* (2018.01)
*G07C 9/00* (2020.01)

(52) U.S. Cl.

CPC .......... *F24F 3/167* (2021.01); *E04B 1/34869* (2013.01); *F24F 11/52* (2018.01); *G07C 9/00896* (2013.01); *G07C 9/00309* (2013.01)

(58) Field of Classification Search

CPC ....... F24F 3/167; F24F 11/52; E04B 1/34869; G07C 9/00896; G07C 9/00309; G07C 2209/63

See application file for complete search history.

(56) References Cited

U.S. PATENT DOCUMENTS

| | | | | |
|---|---|---|---|---|
| 4,667,580 | A * | 5/1987 | Wetzel | E04B 1/34869 52/36.2 |
| 6,379,428 | B1 * | 4/2002 | Mostovoy | H01L 21/67167 55/385.2 |
| 7,448,945 | B2 * | 11/2008 | Bessent | E04H 1/125 52/63 |
| 9,765,980 | B2 | 9/2017 | Holtz et al. | |

(Continued)

FOREIGN PATENT DOCUMENTS

| | | |
|---|---|---|
| EP | 0410098 B1 | 11/1993 |
| EP | 2228130 B1 | 1/2013 |

(Continued)

*Primary Examiner* — Thomas Randazzo

(74) *Attorney, Agent, or Firm* — Seager, Tufte & Wickhem LLP

(57) ABSTRACT

A mobile clean room is configured to provide a clean room environment while moving components between a first stationary clean room and a second stationary clean room. The mobile clean room includes an interior volume and an air quality system configured to maintain a clean room environment within the interior volume. The mobile clean room includes an on-board power supply, an electric tractor coupled to the mobile clean room and configured to move the mobile clean room, and a controller that is operably coupled with the filtration system and the on-board power supply. The controller is configured to monitor and control performance of the air quality system, monitor performance of the on-board power supply, and communicate with a stationary controller controlling operation of the first stationary clean room and/or the second stationary clean room.

20 Claims, 17 Drawing Sheets

(56) References Cited

U.S. PATENT DOCUMENTS

| | | | |
|---|---|---|---|
| 9,795,957 B2 | 10/2017 | Holtz et al. | |
| 10,161,147 B2 | 12/2018 | Jornitz | |
| 10,371,394 B2 | 8/2019 | Wernimont et al. | |
| 10,654,036 B2 | 5/2020 | Holtz et al. | |
| 2017/0370599 A1 | 12/2017 | Marinoni | |
| 2019/0234631 A1 | 8/2019 | Wallace et al. | |
| 2019/0374985 A1 | 12/2019 | Ko et al. | |
| 2022/0064935 A1* | 3/2022 | Williams | E04B 1/34846 |

FOREIGN PATENT DOCUMENTS

| | | |
|---|---|---|
| WO | 2006125546 A1 | 11/2006 |
| WO | 2010045750 A1 | 4/2010 |

* cited by examiner

MOBILE CLEAN ROOM

TECHNICAL FIELD

The present disclosure pertains to clean rooms. More particularly, the present disclosure pertains to mobile clean rooms for isolation of its contents from environmental contamination.

BACKGROUND

A wide variety of devices including medical devices are manufactured and/or stored within clean rooms. In some cases, a particular medical device may be manufactured within two or more different clean rooms, such as when particular steps within the manufacturing process for that particular medical device occur in a first clean room, and one or more subsequent steps within the manufacturing process occur in a second clean room. In some cases, medical device components may be manufactured in a first clean room, and the medical device components may subsequently be assembled together into an assembly in a second clean room.

It will be appreciated that moving the partially constructed medical device from the first clean room to the second clean room can require substantial packaging materials (at some expense) and labor in order to essentially maintain the partially constructed medical device within a clean environment within the packaging. There may be delays between when a number of medical device components are manufactured and when they are subsequently assembled together, necessitating clean storage.

Accordingly, there is an ongoing need to provide an improved way to safely move materials, including medical devices, between clean room environments.

SUMMARY

This disclosure provides alternative clean room systems including a mobile clean room and methods for using a mobile clean room. An example includes a manufacturing system that includes a mobile clean room and a first clean room. The mobile clean room includes a mobile clean room interior volume, wheels that are moveable between an extended position and a retracted position, and an electric tractor that is releasably securable to the mobile clean room and configured to move the mobile clean room when the electric tractor is secured to the mobile clean room and the wheels are in the extended position. The first clean room includes a first clean room interior, a first access region that is configured to provide access to the first clean room interior volume, the mobile clean room configured to dock with first access region, and one or more first doors that are disposed within the first access region, the one or more first doors configured to move between a closed position preventing access to the first clean room interior volume through the one or more first doors and an open position permitting access to the first clean room interior volume through the one or more first doors, each of the one or more first doors including a first door lock. The first clean room includes a first mobile clean room detection sensor that is configured to provide a signal indicating whether the mobile clean room is in position relative to the first access region. The first clean room includes a first clean room controller that is configured to receive the signal from the first mobile clean room detection sensor, send a signal to unlock the first door locks when the signal from the first mobile clean room detection sensor indicates that the mobile clean room is in position relative to the first access region, and not send a signal to unlock the first door locks when the signal from the first mobile clean room detection sensor indicates that the mobile clean room is not in position relative to the first access region.

Alternatively or additionally, the mobile clean room may further include a mobile clean room controller that may be configured to communicate with the first clean room controller.

Alternatively or additionally, the manufacturing system may further include a first door sensor dedicated to each of the one or more first doors, each first door sensor outputting a signal indicating whether a corresponding first door is in an open position or a closed position.

Alternatively or additionally, the mobile clean room controller may be configured to receive a signal from each first door sensor indicating whether each of the one or more first doors is in the open position or the closed position. When the signal from each first door sensor indicates that at least one of the one or more first doors is in the open position, the mobile clean room controller may be configured to output a tractor command preventing the electric tractor from moving the mobile clean room away from the first access region. When the signal from each first door sensor indicates that each of the one or more first doors are in the closed position, the mobile clean room controller may be configured to output a tractor command permitting the electric tractor to move the mobile clean room away from the first access region.

Alternatively or additionally, when the signal from each first door sensor indicates that at least one of the one or more first doors is still open, the mobile clean room controller may be configured to output a wheels command preventing the wheels from being moved into the extended position. When the signal from each first door sensor indicates that each of the one or more first doors are closed, the mobile clean room controller may be configured to output a wheels command enabling the wheels being moved into the extended position.

Alternatively or additionally, the mobile clean room controller may be further configured to send a signal informing the first clean room controller that the electric tractor is permitted to move the mobile clean room away from the first access region, and the first clean room controller may be configured to send a signal to lock the first door locks in response to the signal informing the first clean room controller that the electric tractor is permitted to move the mobile clean room away from the first access region.

Alternatively or additionally, the first mobile clean room detection sensor may include a pair of first mobile clean room detection sensors, and the first clean room controller may be configured to only send a signal to unlock the first door locks when the signals from both first mobile clean room detection sensors indicate that the mobile clean room is in position relative to the first access region.

Alternatively or additionally, the mobile clean room controller may be configured to receive the signals from each first door sensor directly from the first door sensor.

Alternatively or additionally, the first clean room may include a filtration system controlled by the first clean room controller in order to maintain a clean room environmental standard within the first clean room interior volume.

Alternatively or additionally, the manufacturing system may further include a second clean room. The second clean room may include a second clean room interior volume, a second access region providing access to the second clean room interior volume, the mobile clean room configured to dock with the second access region, and one or more second doors that are disposed within the second access region, the one or more second doors configured to move between a closed position preventing access to the second clean room interior volume through the one or more second doors and an open position permitting access to the second clean room interior volume through the one or more second doors, each of the one or more second doors including a second door lock. The second clean room may include a second mobile clean room detection sensor that is configured to provide a signal indicating whether the mobile clean room is in position relative to the second access region. The second clean room may include a second clean room controller that is configured to receive the signal from the second mobile clean room detection sensor, send a signal to unlock the second door locks when the signal from the second mobile clean room detection sensor indicates that the mobile clean room is in position relative to the second access region, and not send a signal to unlock the second door locks when the signal from the second mobile clean room detection sensor indicates that the mobile clean room is not in position relative to the second access region.

Alternatively or additionally, the electric tractor may be configured to move the mobile clean room between the first access region and second access region.

Another example includes a mobile clean room that is configured to provide a clean room environment while moving components between a first stationary clean room and a second stationary clean room. The mobile clean room includes an interior volume, an on-board power supply, an electric tractor that is coupled to the mobile clean room and is configured to move the mobile clean room, an air quality system that is configured to maintain a clean room environment within the interior volume and a controller that is operably coupled with the filtration system and the on-board power supply. The controller is configured to monitor and control performance of the air quality system, monitor performance of the on-board power supply, and communicate with a stationary controller controlling operation of the first stationary clean room and/or the second stationary clean room.

Alternatively or additionally, the stationary controller may include a first stationary controller controlling operation of the first stationary clean room and a second stationary controller controlling operation of the second stationary clean room.

Alternatively or additionally, the mobile clean room may further include a human machine interface (HMI) that is operably coupled with the controller and is configured to display information determined by the controller or received from the stationary controller.

Alternatively or additionally, the mobile clean room may further include extendable wheels that are moveable between an extended position and a retracted position in response to a command from the controller.

Alternatively or additionally, the controller may be configured to provide a command to prevent the extendable wheels from being moved into the extended position or to enable the extendable wheels to be moved into the extended position in response a signal to do so from the stationary controller, wherein when the signals from each first door sensor indicate that at least one of the one or more first doors is in the open position, the mobile clean room controller outputs a wheels command preventing the extendable wheels from being moved into the extended position, and wherein when the signals from each first door sensor indicate that each of the one or more first doors are in the closed position, the mobile clean room controller outputs a wheels command enabling the extendable wheels being moved into the extended position.

Alternatively or additionally, the HMI may be configured to display one or more of a status of on-board power supply, a status of the air quality system including filtration status and/or ventilation status, an open/closed door status of a door providing access to the interior volume of the mobile clean room, whether the mobile clean room is positioned correctly or not, whether either the first stationary clean room or the second stationary clean room is prepared to accept the mobile clean room or to allow the mobile clean room to depart, and whether there are any current alarms.

Alternatively or additionally, the HMI may be configured to allow a user to enter information for the controller.

Another example includes a method of moving components from a first clean room having a first access region with a first door to a second clean room having a second access region with a second door, the components arranged on one or more moveable carts disposed within the first clean room. The method includes moving a mobile clean room to a position proximate the first access region, the mobile clean room including a mobile clean room door and confirming that the mobile clean room is appropriately positioned relative to the first access region. The first door and then the mobile clean room door are sequentially opened. The one or more moveable carts are moved from inside the first clean room into the mobile clean room. The mobile clean room door and then the first door are sequentially closed, and the closure of the mobile clean room door and the first door are confirmed. The mobile clean room is moved to a position proximate the second access region and appropriate positioning of the mobile clean room relative to the second access region is confirmed. The second door and then the mobile clean room door are sequentially opened. The one or more moveable carts are moved from inside the mobile clean room into the second stationary clean room.

Alternatively or additionally, the mobile clean room may include extendable wheels moveable between an extended position for moving the mobile clean room and a retracted position, and moving the mobile clean room into a position proximate either the first access region or the second access region includes moving the extendable wheels into the extended position before moving the mobile clean room into the position proximate either the first access region or the second access region, and moving the extendable wheels into the retracted position after moving the mobile clean room into the position proximate either the first access region or the second access region.

Alternatively or additionally, confirming that the mobile clean room door and the first door are both closed may include receiving confirmation from a stationary clean room door sensor configured to indicate whether the first door is open or closed.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
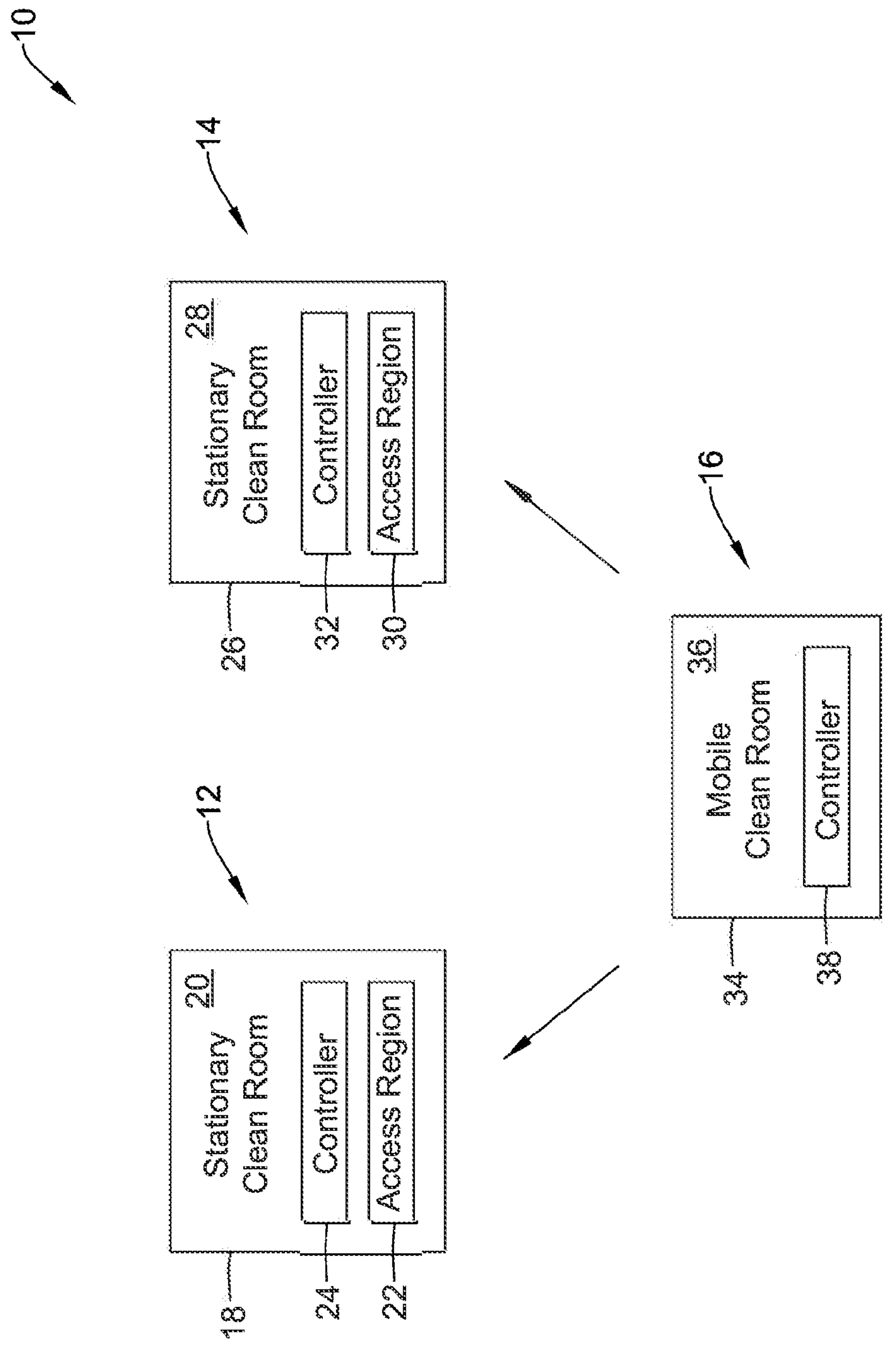
FIG. 1 is a schematic block diagram of an illustrative manufacturing system including a first stationary clean room, a second stationary clean room and a mobile clean room that may be used to move materials between the first stationary clean room and the second stationary clean room.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "or" unless the content clearly dictates otherwise.

It is noted that references in the specification to "an embodiment", "some embodiments", "other embodiments", etc., indicate that the embodiment described may include one or more particular features, structures, or characteristics. However, such recitations do not necessarily mean that all embodiments include the particular features, structures, or characteristics. Additionally, when particular features, structures, or characteristics are described in connection with one embodiment, it should be understood that such features, structures, or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the present disclosure.

Clean rooms are relied upon when manufacturing a variety of different products that can be negatively impacted if the products are manufactured in a dirty environment. For example, clean rooms may be used in medical device manufacturing, life sciences, pharmaceuticals and biotech. Clean rooms may be used in critical process manufacturing in fields such as aerospace, DOE (department of energy), military, and optics, for example. Clean rooms can also be relied upon in scientific research.

A clean room is an environment having a controlled level of allowed contamination. In some cases, the contamination level is measured in terms of a number of particles per cubic meter at a particular particle size. Clean rooms can employ air quality systems, such as but not limited to air filtration systems and ventilation systems to ensure that the air quality inside the clean room meets one or more of a variety of different air quality standards. In some cases, HEPA (high efficiency particulate air) filters or ULPA (ultra-low particular air) filters may be used to limit contaminate concentrations within the clean room.

Individuals working within a clean room may enter and exit the clean room through air locks (an inner door and an outer door separated by a space) or an air shower. In some cases, individuals may enter and exit through a gowning room that may essentially form the space between the inner door and the outer door, for example.

Individuals working within a clean room may utilize a range of protective clothing, ranging from the relatively simple, such as a lab coat and a hair net, to complex, such as a multiple layer suit with self-contained breathing apparatus, in order to reduce or eliminate chances of substances being released into the environment within the clean room. It will be appreciated that there is a wide range of protective clothing options, depending at least in part upon the particular air quality standards being employed for a particular clean room.

For example, air quality standards for the interior of a clean room may be determined in accordance with ISO 14644. The ISO 14644 standard defines a number of classes, ranging from ISO 1 to ISO 9. ISO 1 defines particularly stringent limitations on particle counts per cubic meter for each of a variety of different particle sizes while ISO 9 is approximately equal to outside air.

In some cases, various products, or perhaps components of those products, may be manufactured within a single clean room. In some instances, various products, or perhaps components of those products, may be manufactured within two or more clean rooms that may be physically separated. One or more, or several components for a particular product may be manufactured in a first clean room and may be assembled into the actual product in a second clean room. A first clean room may be in a west wing of a building, for example, while a second clean room may be in an east wing of the same building. In some cases, a first clean room may be in a first building within a complex and a second clean room may be in a second building within the complex.

FIG. 1 is a schematic block diagram of an illustrative manufacturing system 10 that includes a stationary clean room 12 and a stationary clean room 14. While a total of two stationary clean rooms 12, 14 are shown, this is merely illustrative, as the manufacturing system 10 may employ two, three, four, five or more clean rooms, for example. The manufacturing system 10 includes a mobile clean room 16 that may be used to move products or components of products from the stationary clean room 12 to the stationary clean room 14, or to move products or components of products from the stationary clean room 14 to the stationary clean room 12. In this, "stationary" is used to refer to the clean rooms 12 and 14 in order to distinguish between the stationary clean rooms 12 and 14 and the mobile clean room 16.

The stationary clean room 12 and/or the stationary clean room 14 may be clean rooms that are permanently built into a building, or into separate buildings within a complex. The stationary clean room 12 and/or the stationary clean room 14 may be clean rooms that are built in a modular fashion, and may be intended for either permanent use or only temporary use. However, a distinguishing feature of the stationary clean room 12 and the stationary clean room 14 is that they do not move relative to each other in order to transfer materials therebetween. Rather, the mobile clean room 16 is relied upon to transfer materials between the stationary clean room 12 and the stationary clean room 14.

The stationary clean room 12 includes a periphery 18 that defines an interior volume 20 within the periphery 18. The periphery 18 may include walls that are built within the building, for example. Not pictured are any sort of air lock or other features for workers within the stationary clean room 12 to enter the stationary clean room 12. The stationary clean room 12 includes an access region 22 that as will be discussed, may be configured to allow the mobile clean room 16 to dock with the access region 22. The access region 22 may include one or more doors that may be selectively opened in order to provide access between the stationary clean room 12 and the mobile clean room 16 while effectively preventing outside air (air not within the stationary clean room 12 or the mobile clean room 16) from entering the stationary clean room 12 or the mobile clean room 16.

A controller 24 controls operation of the stationary clean room 12, such as but not limited to operation of the particular air quality control systems employed within the stationary clean room 12. As will be discussed, the controller 24 also monitors signals from sensors (not shown) that provide information regarding the status of the access region 22 and the mobile clean room 16.

The stationary clean room 14 includes a periphery 26 that defines an interior volume 28 within the periphery 26. The periphery 26 may include walls that are built within the building, for example. Not pictured are any sort of air lock or other features for workers within the stationary clean room 14 to enter the stationary clean room 14. The stationary clean room 14 includes an access region 30 that as will be discussed, may be configured to allow the mobile clean room 16 to dock with the access region 30. The access region 30 may include one or more doors that may be selectively opened in order to provide access between the stationary clean room 14 and the mobile clean room 16 while effectively preventing outside air (air not within the stationary clean room 14 or the mobile clean room 16) from entering the stationary clean room 14 or the mobile clean room 16.

A controller 32 controls operation of the stationary clean room 14, such as but not limited to operation of the particular air quality control systems employed within the stationary clean room 14. As will be discussed, the controller 32 also monitors signals from sensors (not shown) that provide information regarding the status of the access region 30 and the mobile clean room 16.

The controller 24 and the controller 32 are shown as being separate controllers. In some cases, the controller 24 and the controller 32 may be separate. In some instances, the controller 24 and the controller 32 may be manifested within a single controller, which may be a dedicated-purpose machine, a personal computer that has been programmed to control operation of the stationary clean room 12 and/or the stationary clean room 14, or even a cloud-based server. In some cases, the controller 24 and the controller 32 are able to communicate with each other, through a wired or wireless LAN (local area network) within the building or building complex housing the stationary clean room 12 and the stationary clean room 14.

The mobile clean room 16 includes a periphery 34 that defines an interior volume 36 within the periphery 34. The mobile clean room 16 includes a controller 38 that controls operation of the mobile clean room 16, such as but not limited to operation of the particular air quality control systems employed within the mobile clean room 16. As will be discussed, the controller 38 may communicate with the controllers 24 and 32 in order to share information regarding the status of each of the stationary clean room 12, the stationary clean room 14, and the mobile clean room 16.

The periphery 34 may define a large box that has dimensions sufficient to accommodate the materials to be transferred within the mobile clean room 16 while not too large to be able to easily move the mobile clean room 16 within the building or even between buildings, as desired. Accordingly, the periphery 34 of the mobile clean room 16 may have overall dimensions providing the mobile clean room 16 with an overall width of about two to eight feet, an overall length of about four to about ten feet, and an overall height of about four to ten feet. In some cases, the mobile clean room 16 may have an overall width of about four to six feet, an overall length of about five to seven feet, and an overall height of about seven to eight feet.

Figure 2:
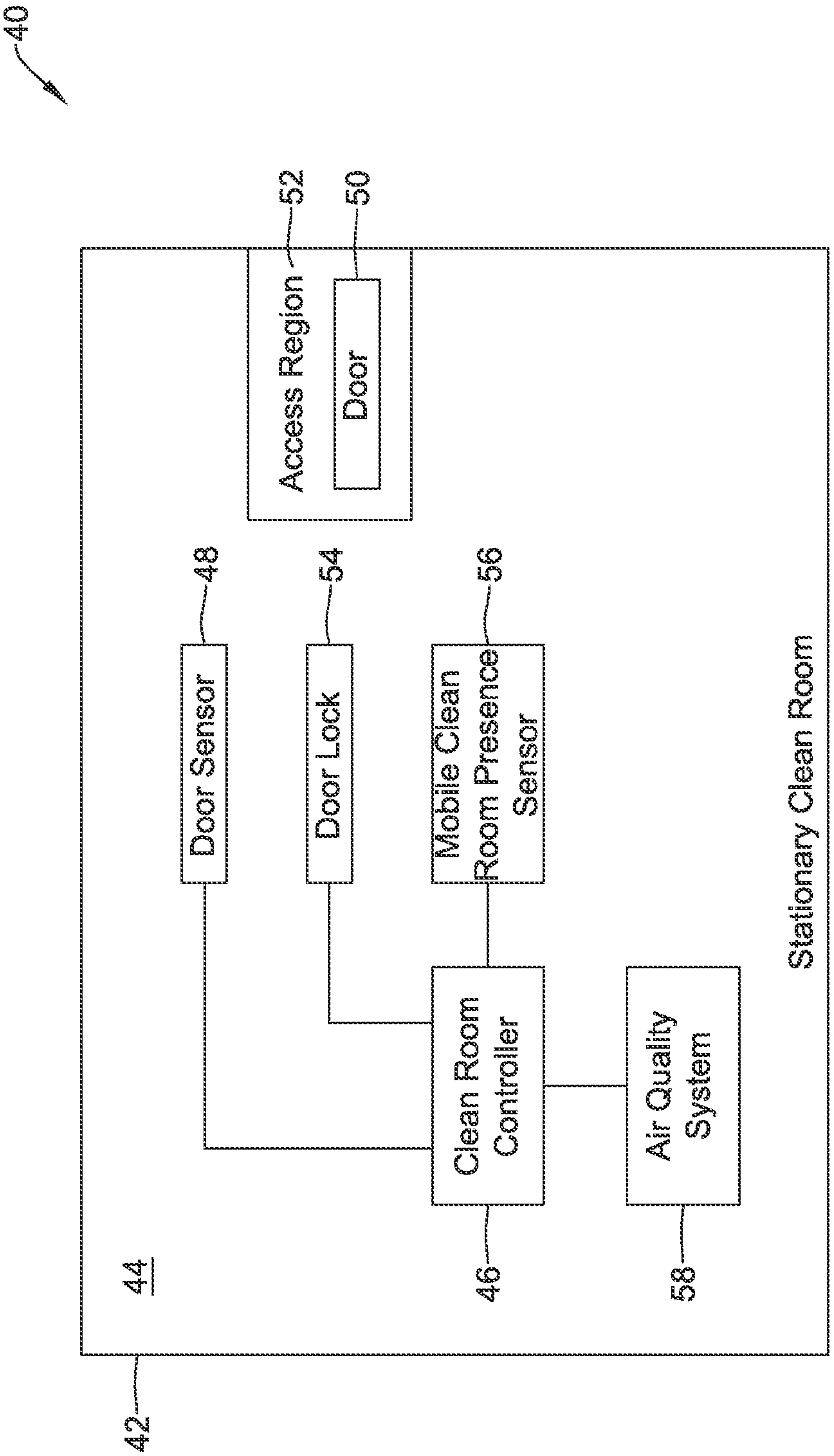
FIG. 2 is a schematic block diagram of an illustrative stationary clean room that may be used as either the first stationary clean room or the second stationary clean room shown in FIG. 1.

FIG. 2 is a schematic block diagram of an illustrative stationary clean room 40. The illustrative stationary clean room 40 may be considered as being an example of the stationary clean room 12 and/or the stationary clean room 14, for example. Features ascribed to the stationary clean room 12 or the stationary clean room 14 may be considered as being applicable to the stationary clean room 40. Similarly, features ascribed to the stationary clean room 40 may be applicable to the stationary clean room 12 or the stationary clean room 14.

The stationary clean room 40 includes a periphery 42 defining an interior volume 44 within the periphery 42. The stationary clean room 40 includes a clean room controller 46 that may be located within the interior volume 44. In some instances, the clean room controller 46 may instead be located outside of the stationary clean room 40. The clean room controller 46 may be configured to monitor signals from one or more sensors, for example, as well as to provide appropriate commands for systems within the stationary clean room 40.

The stationary clean room 40 includes a door sensor 48 that may be configured to output a signal indicating whether a door 50, which is located within an access region 52 is open or closed, or locked or unlocked. In some instances, the door sensor 48 may be a proximity sensor or a contact sensor, for example. The signal from the door sensor 48 may be provided to the clean room controller 46, for example. In some cases, the signal from the door sensor 48 may be communicated directly to a mobile clean room controller 66 (seen in FIG. 3). For instance, the door sensor 48 may send a signal to the clean room controller 46 indicative of whether the door is unlocked and/or open, or indicative of whether the door is locked and/or closed. The door sensor 48, which may be a single sensor if the access region 52 only includes a single door 50 such as a single hinged door or a roll-up door, or which may represent two or more door sensors if the access region 52 includes two or more doors. In some cases, the access region 52 may include a pair of oppositely hinged swinging doors that can close together to close the access region 52 or can open together to form a large opening within the access region 52 to accommodate the mobile clean room 16.

The stationary clean room 40 includes a door lock 54. The door lock 54 may be an electromechanical lock, for example, and can be locked or unlocked via an appropriate electrical signal from the clean room controller 46. A mobile clean room presence sensor 56 is configured to provide a signal to the clean room controller 46 indicating whether a mobile clean room (such as the mobile clean room 16) is properly in position proximate the access region 52. In some cases, if the mobile clean room presence sensor 56 indicates that the mobile clean room is properly in position proximate the access region 52, the clean room controller 46 may send a command to the door lock(s) 54, instructing the door lock(s) 54 to unlock. If the mobile clean room presence sensor 56 does not provide such an indication, the door lock(s) 54 may be kept locked, or may be commanded to lock if not already locked.

The stationary clean room 40 includes an air quality system 58 that is configured to regulate air quality within the stationary clean room 40. The air quality system 58 may be monitored and controlled by the clean room controller 46, for example. The air quality system 58 may include a filtration system and/or a ventilation system, for example. The air quality system 58 may include one or more sensors (not shown) that provide feedback to the clean room controller 46 in order to help the clean room controller 46 properly manage operation of the air quality system 58.

Figure 3:
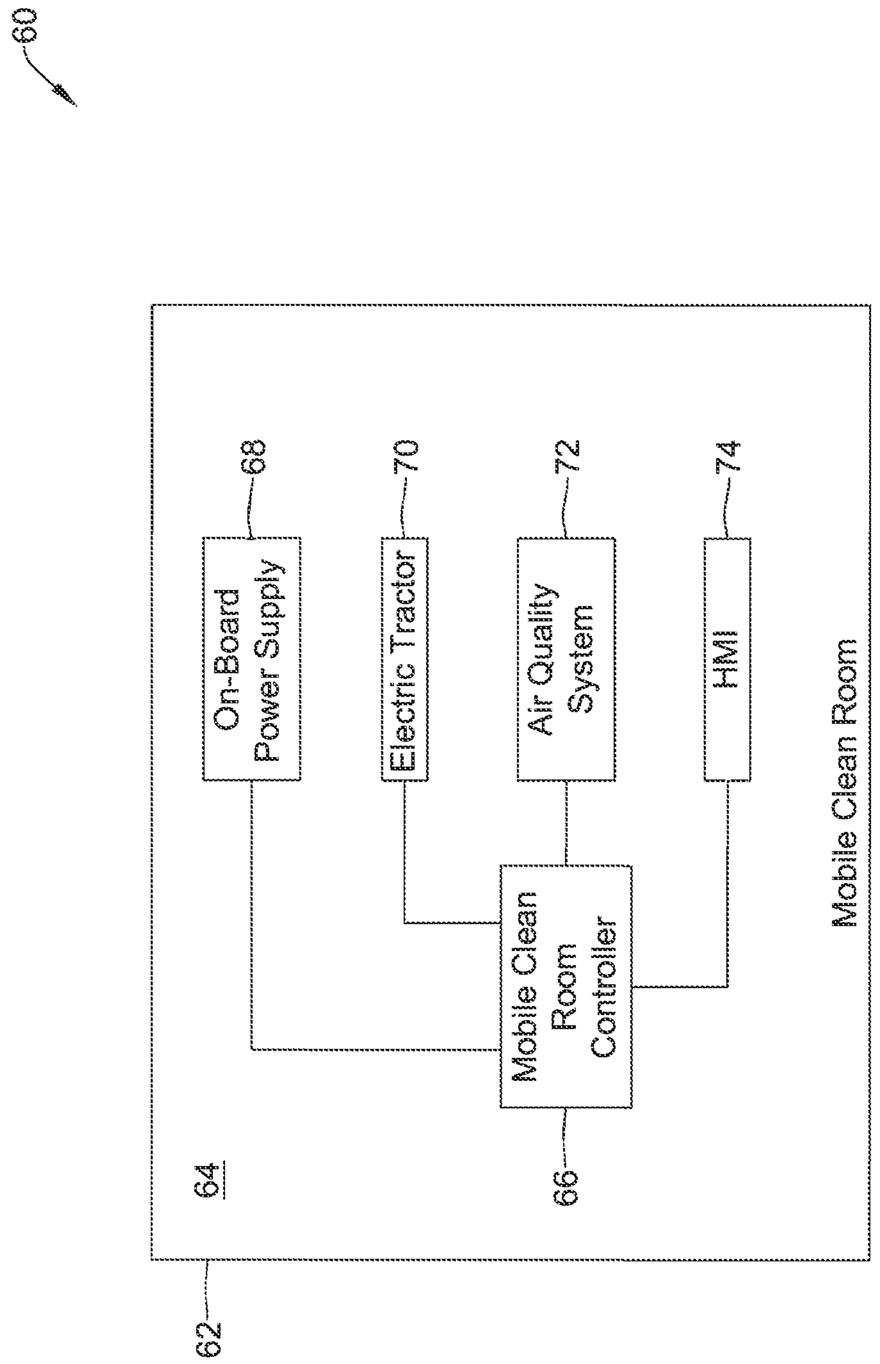
FIG. 3 is a schematic block diagram of an illustrative mobile clean room that may be used as part of the manufacturing system shown in FIG. 1.

FIG. 3 is a schematic block diagram of an illustrative mobile clean room 60 that may be considered as being an example of the mobile clean room 16. Features ascribed to the mobile clean room 16 may be considered as being applicable to the mobile clean room 60. Similarly, features ascribed to the mobile clean room 60 may be applicable to the mobile clean room 16

The mobile clean room 60 includes a periphery 62 that defines an interior volume 64. The periphery 62 of the mobile clean room 60 may have overall dimensions providing the mobile clean room 60 with an overall width of about two to eight feet, an overall length of about four to about ten feet, and an overall height of about four to ten feet. In some cases, the mobile clean room 60 may have an overall width of about four to six feet, an overall length of about five to seven feet, and an overall height of about seven to eight feet.

The mobile clean room 60 includes a mobile clean room controller 66 that controls operation of the mobile clean room 16, such as but not limited to operation of the particular air quality control systems employed within the mobile clean room 60. As will be discussed, the mobile clean room controller 66 may communicate with the clean room controller 46 in order to share information regarding the status of the stationary clean room 40 and the mobile clean room 60.

The mobile clean room 60 includes an on-board (e.g., portable) power supply 68 that allows the mobile clean room 60 to have power to function without requiring that the mobile clean room 60 be connected to a source of building power. In some cases, the on-board power supply 68 may include the circuitry (not shown) that allows the mobile clean room 60 to be plugged into building power, such as 120 volts or 240 volts when the mobile clean room 60 is positioned within reach of building power, and to use some of that power to recharge the on-board power supply 68. The on-board power supply 68 may include one or more batteries, such as rechargeable batteries, for example. The mobile clean room controller 66 may monitor a remaining charge within the on-board power supply 68, for example, and may inform a user that recharging is required when the power supply drops down or below a particular power level threshold. The on-board power supply 68 provides power for operation of the mobile clean room 60, particularly when not plugged in or when there is a loss of building power.

The mobile clean room 60 includes an electric tractor 70 that may be used to move the mobile clean room 60 when appropriate. In some instances, the electric tractor 70 is built into the mobile clean room 60. In some instances, the electric tractor 70 is separate from the mobile clean room 60, but can be operably coupled to the mobile clean room 60 when it is desired to use the electric tractor 70 to move the mobile clean room 60. This may allow a single electric tractor 70 to be used to move two or more different mobile clean rooms 60, rather than requiring that each mobile clean room 60 has its own electric tractor 70. In some cases, the electric tractor 70 may essentially take the form of a pallet jack or a pallet truck, which can have its own power supply or can operably couple to the mobile clean room 60 in order to utilize power provided by the on-board power supply 68.

The mobile clean room 60 includes an air quality system 72 that is configured to regulate air quality within the mobile clean room 60. The air quality system 72 may be monitored and controlled by the mobile clean room controller 66, for example. The air quality system 72 may include a filtration system and/or a ventilation system, for example. The air quality system 72 may include one or more sensors (not shown) that provide feedback to the mobile clean room controller 66 in order to help the mobile room controller 66 properly manage operation of the air quality system 72.

In some cases, the mobile clean room 60 may include an HMI (human machine interface) 74 that is operably coupled with the mobile clean room controller 66. The HMI 74 allows the mobile clean room controller 66 to display various information such as sensor outputs for a human to see and understand. The HMI 74 may allow the mobile clean room controller 66 to solicit information from the user, such as but not limited to settings, threshold values and the like. In some cases, the HMI 74 may include a display that can display information as well as a keyboard or other data entry device that can be used by the user to enter information. The HMI 74 may be a touch screen display, for example, which effectively combines both display and data entry functionality.

In some cases, the HMI 74 may be configured to display one or more of a status of an on-board power supply, a status of the air quality system including filtration status and/or ventilation status, an open/closed door status of a door providing access to the interior volume of the mobile clean room, whether the mobile clean room is positioned correctly or not, whether either the first stationary clean room or the second stationary clean room is prepared to accept the mobile clean room or to allow the mobile clean room to depart, and whether there are any current alarms. In some instances, the HMI 74 may be configured to allow a user to enter information for the mobile clean room controller 66.

Figure 4:
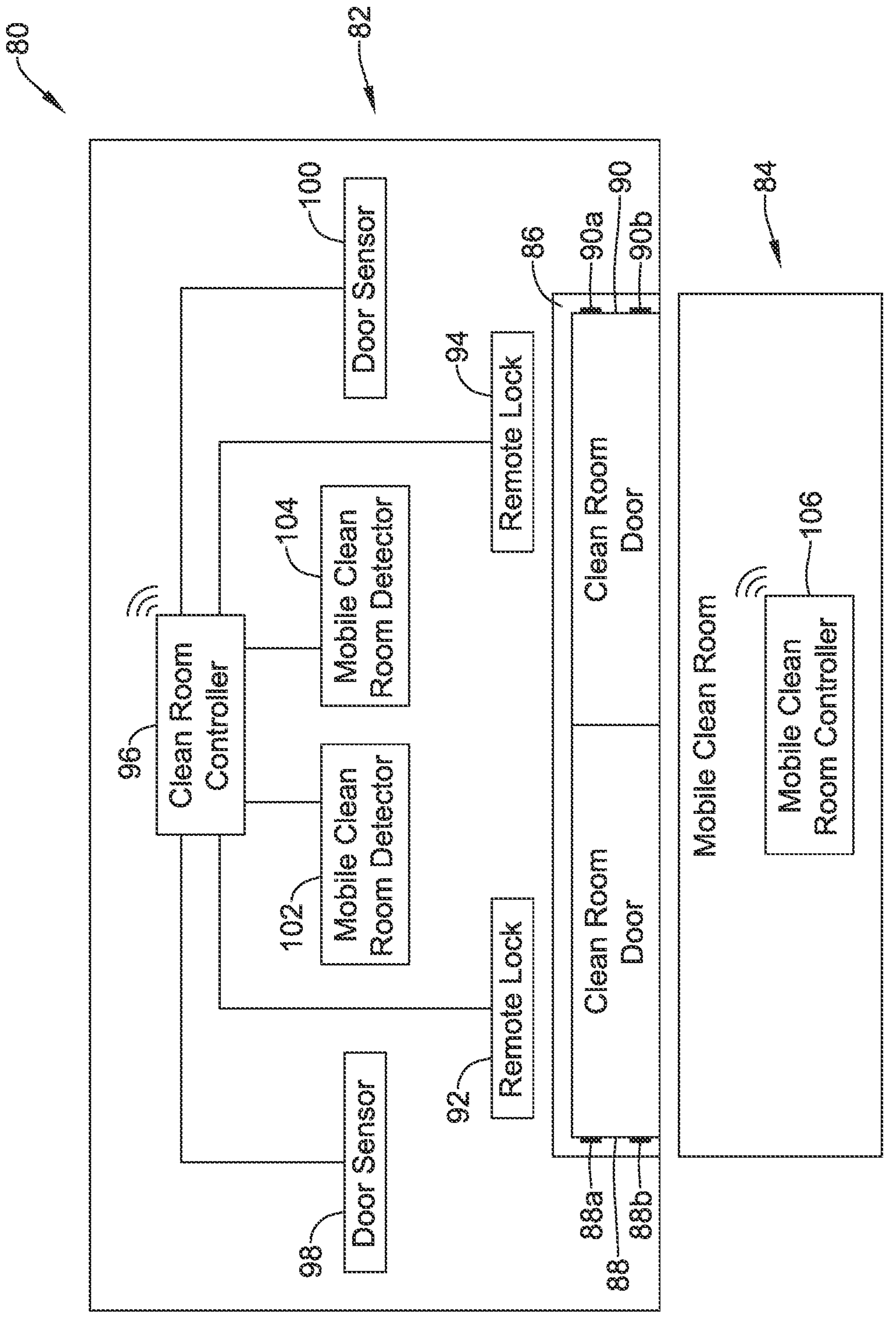
FIG. 4 is a schematic block diagram of an illustrative manufacturing system.

FIG. 4 is a schematic block diagram of an illustrative manufacturing system 80. The illustrative manufacturing system 80 may be considered as being an example of the manufacturing system 10. Features ascribed to the manufacturing system 10 may be considered as being applicable to the manufacturing system 80. Similarly, features ascribed to the manufacturing system 80 may be applicable to the manufacturing system 10.

The manufacturing system 80 includes a stationary clean room 82 and a mobile clean room 84. The stationary clean room 82 may be considered as being an example of the stationary clean room 12, the stationary clean room 14 or the stationary clean room 40. Features ascribed to the stationary clean room 82 may be applicable to any of the stationary clean room 12, the stationary clean room 14 and the stationary clean room 40, and vice versa. Features ascribed to the mobile clean room 84 may be applicable to the mobile clean room 16 or the mobile clean room 60, and vice versa.

The stationary clean room 82 includes an access region 86. Within the access region 86 is a clean room door 88 and a clean room door 90. The clean room door 88 may include hinges 88*a* and 88*b* and the clean room door 90 may include hinges 90*a* and 90*b*. It will be appreciated that the clean room door 88 and the clean room door 90 together may swing together to close access through the access region 86 and may swing apart in order to provide access through the access region 86.

The stationary clean room 82 includes a door lock 92 and a door lock 94, each of which are operably coupled with a clean room controller 96. The door lock 92 may be positioned to reversibly lock or unlock the clean room door 88 and the door lock 94 may be positioned to reversibly lock or unlock the clean room door 90. In some cases, the door lock 92 may be commanded to lock or unlock the clean room door 88 in response to a command to do so from the clean room controller 96. The door lock 94 may be commanded to lock or unlock the clean room door 90 in response to a command to do so from the clean room controller 96.

The stationary clean room 82 includes a door sensor 98 and a door sensor 100. The door sensor 98 and the door sensor 100 are each operably coupled with the clean room controller 96. The door sensor 98 may be positioned and configured to provide a signal to the clean room controller 96 indicating whether the clean room door 88 is open or closed. The door sensor 100 may be positioned and configured to provide a signal to the clean room controller 96 indicating whether the clean room door 90 is open or closed.

The stationary clean room 82 includes a mobile clean room detection sensor 102 and a mobile clean room detection sensor 104. In some cases, the mobile clean room detection sensor 102 and the mobile clean room detection sensor 104 are both positioned and configured to detect the presence or absence of the mobile clean room 84 and to provide signals indicating the presence or absence of the mobile clean room 84 to the clean room controller 96. The mobile clean room detection sensor 102 and the mobile clean room detection sensor 104 may both be optical or laser sensors, for example. In other instances, the mobile clean room detection sensor 102 may emit an optical or laser beam while the mobile clean room detection sensor 104 may detect the optical or laser beam. The proper position of the mobile clean room 84 may interrupt an optical or laser beam extending between the mobile clean room detection sensor 102 and the mobile clean room detection sensor 104. In some cases, detection of the interruption of the optical or laser beam provides a verification that the mobile clean room 84 is in fact positioned proximate the access region 86, as evidenced by both the mobile clean room detection sensor 102 and the mobile clean room detection sensor 104 before the clean room controller 96 commands the door locks 92 and 94 to unlock the clean room doors 88 and 90, respectively.

The mobile clean room 84 includes a mobile clean room controller 106. The mobile clean room controller 106 manages operation of the mobile clean room 84. In some instances, the clean room controller 106 may be configured to communicate wirelessly with the clean room controller 96 in order to share status information between the mobile clean room controller 106 and the clean room controller 96. In some cases, the clean room controller 96 may be configured to communicate wirelessly with the mobile clean room controller 106 when the mobile clean room 84 is not yet in position proximate the access region 96 and to communicate in a wired fashion once the mobile clean room 84 is properly positioned proximate the access region 96. A wired connection such as but not limited to an Ethernet cable may be connected between the mobile clean room 84 and the stationary clean room 82 when the mobile clean room 84 is positioned proximate the access region 96. A wired connection may include multiple connections, and may accommodate unidirectional or even bidirectional flow of information between the clean room controller 96 and the mobile clean room controller 106, but also a flow of power from the stationary clean room 82 to the mobile clean room 84.

The mobile clean room controller 106 may be configured to receive a signal from each door sensor 98 and 100 indicating whether each of the clean room doors 88 and 90 is open or closed. When the signal from the door sensors 98 and 100 indicates that at least one of the clean room doors 88 and 90 is still open, the mobile clean room controller may be configured to output a tractor command preventing the electric tractor from moving the mobile clean room 82 away from the access region 86. When the signal from the door sensors 98 and 100 indicate that each of the clean room doors 88 and 90 is closed, the mobile clean room controller 106 may be configured to output a tractor command permitting the electric tractor to move the mobile clean room 106 away from the access region 86.

In some cases, the mobile clean room 84 may include extendable wheels moveable between an extended position for moving the mobile clean room and a retracted position. When the signal from the door sensors 98 and 100 indicate that at least one of the clean room doors 88 and 90 are still open, the mobile clean room controller 106 may be configured to output a wheels command preventing the extendable wheels from being moved into the extended position. When the signal from the door sensors 98 and 100 indicate that each of the clean room doors 88 and 90 is closed, the mobile clean room controller 106 may be configured to output a wheels command enabling the extendable wheels being moved into the extended position. In some cases, before the electric tractor is commanded to move the mobile clean room 84 away from the access region 106, the mobile clean room controller 106 may be configured to send a signal informing the clean room controller 96 of this, and in response the clean room controller 96 may be configured to send a signal to lock the door locks 92 and 94.

Figure 5:
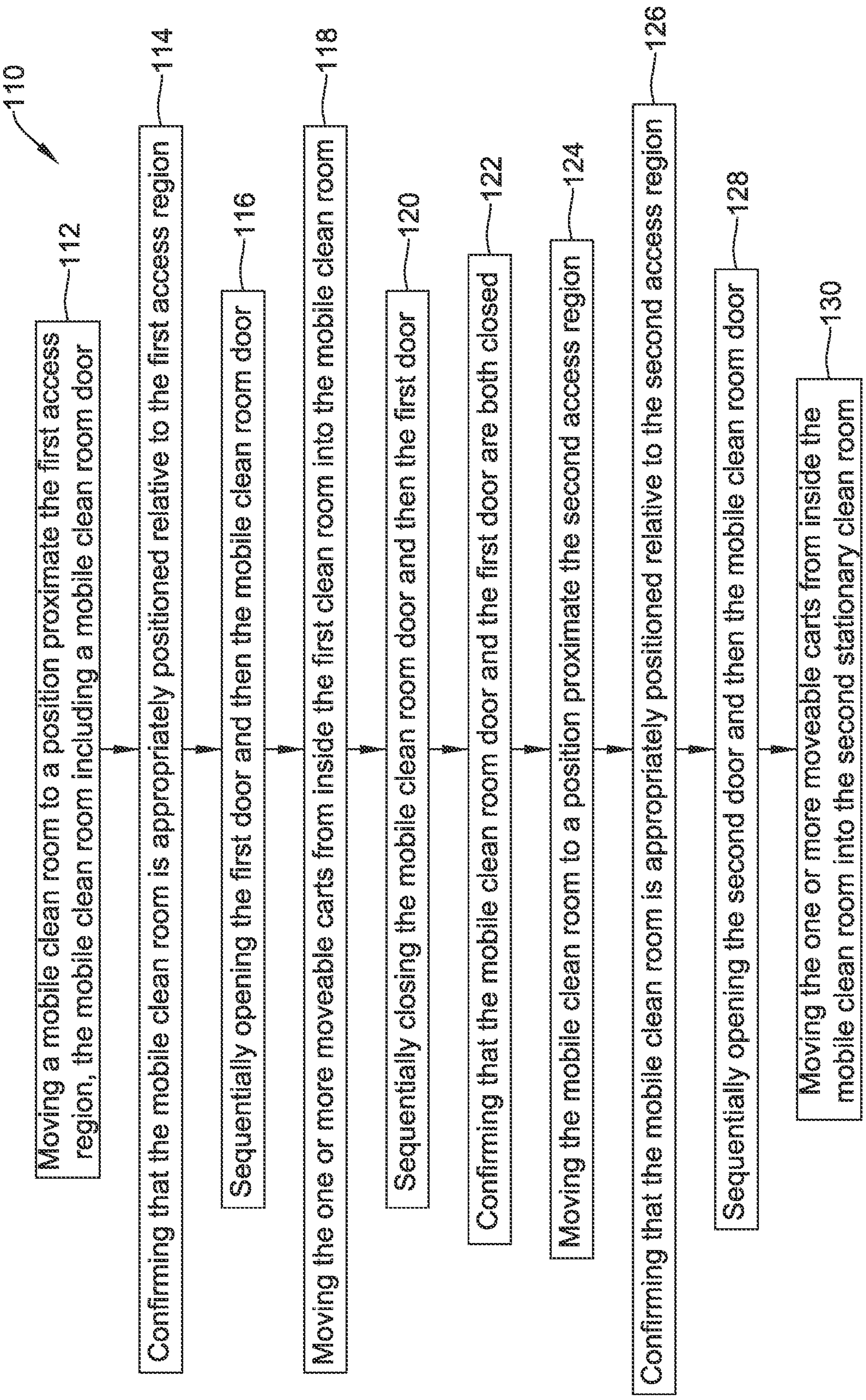
FIG. 5 is a flow diagram showing an illustrative method of using a mobile clean room to move components from a first clean room to a second clean room.

FIG. 5 is a flow diagram showing an illustrative method 110 of moving components, such as medical device components, from a first clean room (such as the stationary clean room 12) having a first access region (such as the access region 22) with a first door to a second clean room (such as the stationary clean room 14) having a second access region (such as the access region 30) with a second door, the components arranged on one or more moveable carts disposed within the first clean room. The method 110 includes moving a mobile clean room (such as the mobile clean room 16 or the mobile clean room 60) to a position proximate the first access region, the mobile clean room including a mobile clean room door, as indicated at block 112. Confirmation is made that the mobile clean room is appropriately positioned relative to the first access region, as indicated at block 114. For example, confirmation may be made that the mobile clean room has been moved into sealing engagement with a door frame around the first door of the first access region. As a result, the first door and then the mobile clean room door are sequentially opened, as indicated at block 116.

The one or more moveable carts are moved from inside the first clean room into the mobile clean room, as indicated at block 118. The mobile clean room door and then the first door are sequentially closed, as indicated at block 120. Confirmation is made that the mobile clean room door and the first door are both closed, as indicated at block 122. The mobile clean room is moved to a position proximate the second access region, as indicated at block 124. Confirmation is made that the mobile clean room is appropriately positioned relative to the second access region, as indicated at block 126. For example, confirmation may be made that the mobile clean room has been moved into sealing engagement with a door frame around the second door of the second access region. The second door and then the mobile clean room door are sequentially opened, as indicated at block 128. The one or more moveable carts are moved from inside the mobile clean room into the second stationary clean room, as indicated at block 130.

In some cases, the mobile clean room includes extendable wheels moveable between an extended position for moving the mobile clean room and a retracted position, and moving the mobile clean room into a position proximate either the first access region or the second access region includes moving the extendable wheels into the extended position before moving the mobile clean room into the position proximate either the first access region or the second access region, and moving the extendable wheels into the retracted position after moving the mobile clean room into the position proximate either the first access region or the second access region.

FIGS. 6 through 16 illustrate aspects of a mobile clean room 140 and a stationary clean room 222 of a manufacturing system 190. It is understood that aspects described above may be incorporated into the mobile clean room 140 and/or the stationary clean room 222. Thus, the features and functionality of the mobile clean room 16, the mobile clean room 60, and/or the mobile clean room 84 may be included in the mobile clean room 140, as desired. Furthermore, the features and functionality of the stationary clean room 12, the stationary clean room 14, the stationary clean room 40, and/or the stationary clean room 82 may be included in the stationary clean room 222, as desired.

Figure 6:
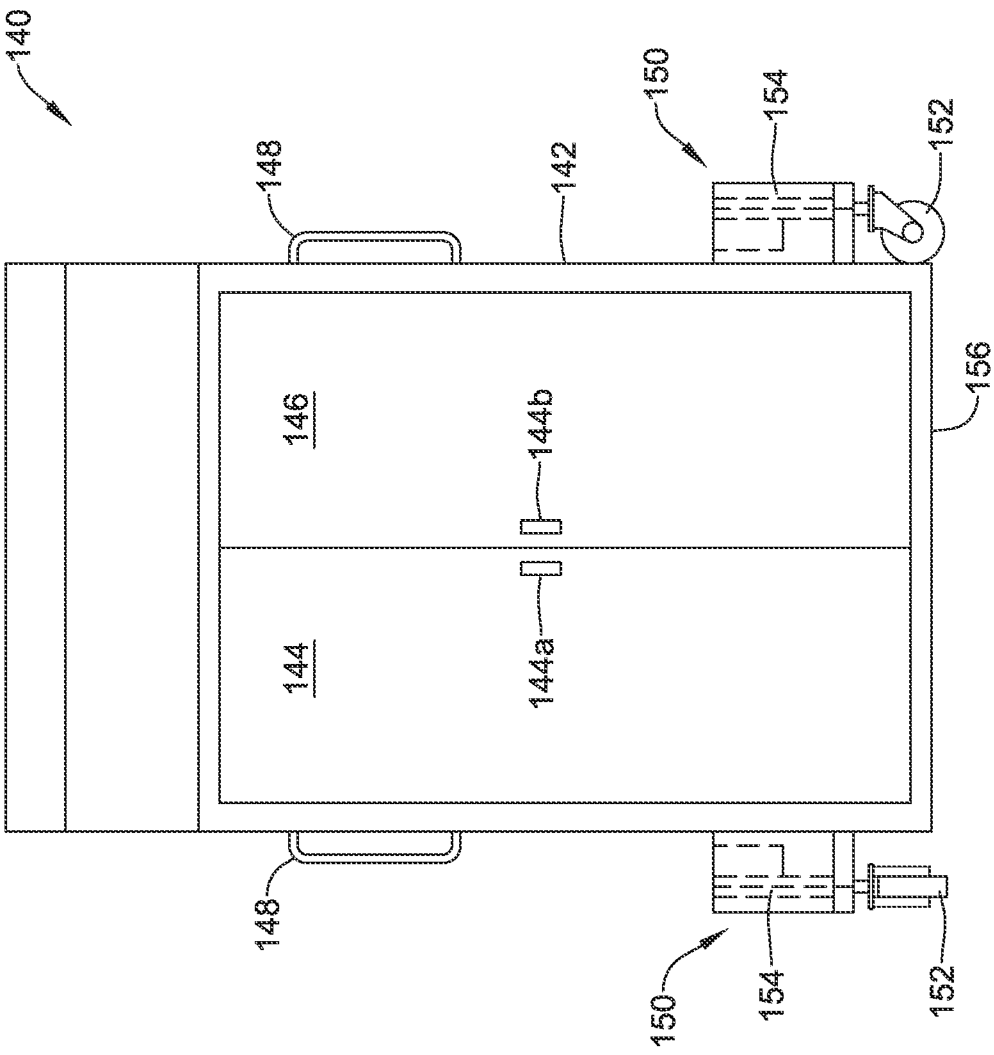
FIG. 6 is a front view of an illustrative mobile clean room.

FIG. 6 is a front view of an illustrative mobile clean room 140. The illustrative mobile clean room 140 may be considered as being an example of the mobile clean room 16, the mobile clean room 60 or the mobile clean room 84. Features ascribed to the mobile clean room 140 may be applicable to any of the mobile clean room 16, the mobile clean room 60 or the mobile clean room 84. Features ascribed to any of the mobile clean room 16, the mobile clean room 60 or the mobile clean room 84 may be applicable to the mobile clean room 140.

The mobile clean room 140 includes an enclosure 142. The enclosure 142 may be formed of any suitable material. In some cases, the enclosure 142 is metallic, such as but not limited to aluminum or steel, for example. The enclosure 142 may have dimensions sufficient to accommodate the materials to be transferred within the mobile clean room 140 while not too large to be able to easily move the mobile clean room 140 within the building or even between buildings, as desired. Accordingly, the enclosure 142 may have overall dimensions providing the mobile clean room 140 with an overall width of about two to eight feet, an overall length of about four to about ten feet, and an overall height of about four to ten feet. In some cases, the mobile clean room 140 may have an overall width of about four to six feet, an overall length of about five to seven feet, and an overall height of about seven to eight feet.

The mobile clean room 140 includes a pair of doors 144 and 146 having handles **144*a* and 144*b*, respectively. In some cases, the doors 144 and 146 may be configured to be able to open into an access region of a stationary clean room once the doors of the stationary clean room have been opened. Accordingly, the doors 144 and 146 may be opened from an interior of a stationary clean room, assuming that the doors 144 and 146** have been permitted to be unlocked, and the doors within the access region of the stationary clean room have first been unlocked and opened.

The mobile clean room 140 includes several handles 148 that may be used in moving the mobile clean room 140 without an electric tractor. In some cases, the handles 148 may be used to fine tune the position of the mobile clean room relative to an access region of a stationary clean room. The handles 148 may be formed of steel, for example, and may be welded, soldered or bolted onto the side of the enclosure 142.

The mobile clean room 140 includes a total of four wheel assemblies 150, one near each corner of the enclosure 142, although only two wheel assemblies 150 are visible in FIG. 6. Each wheel assembly 150 includes a wheel 152 and a wheel support mechanism 154. In some cases, each wheel 152 is free to pivot. Each wheel support mechanism 154 may be configured to move between an extended position, as shown, in which the wheels 152 extend downward beyond a bottom edge 156 of the enclosure 142 and lift the enclosure 142 off the ground a short distance so as to be able to move the enclosure 142, and a retracted position (not shown) in which the wheels 152 are lifted above the bottom edge 156 of the enclosure 142. The wheel support mechanisms 154 may be electromechanical mechanisms that can be operated by the mobile clean room controller, for example. In some instances, the wheel support mechanisms 154 may be manually operated to move them between their extended and retracted positions.

Figure 7:
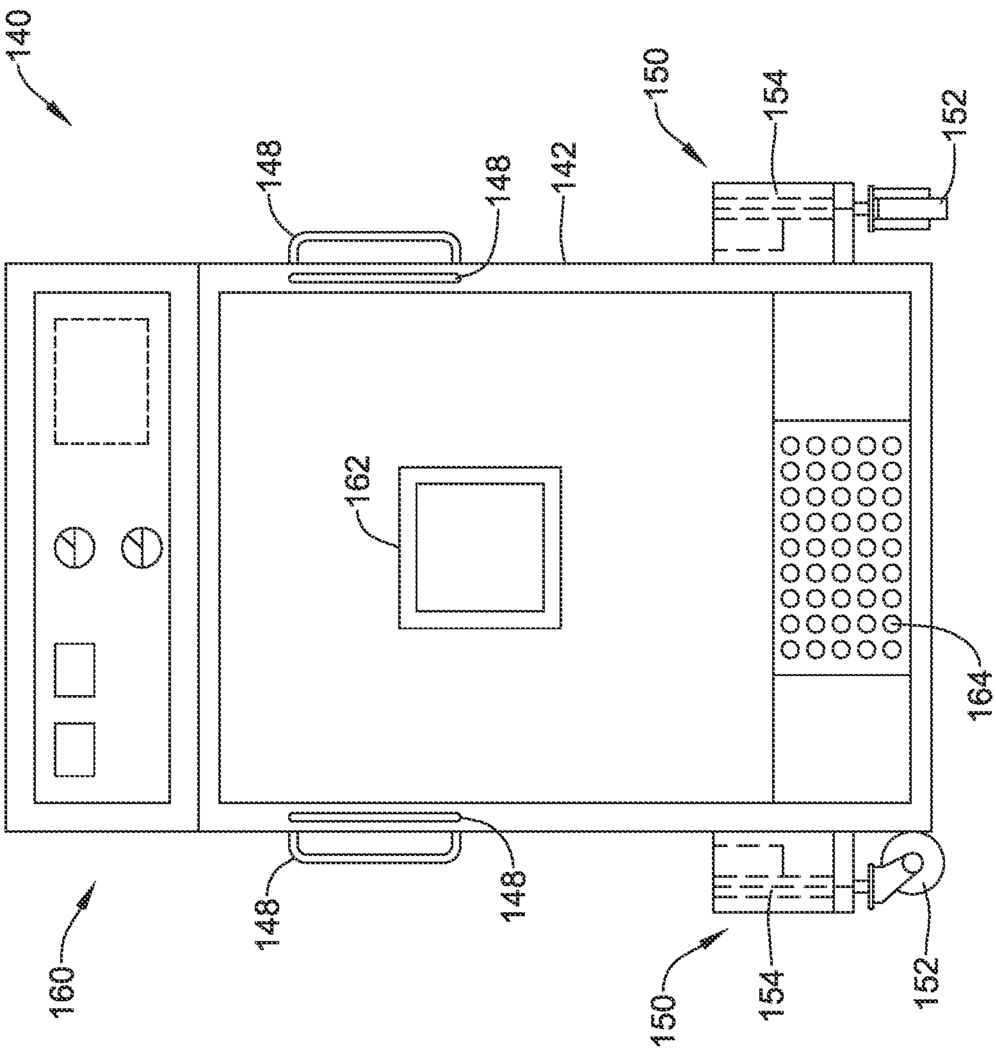
FIG. 7 is a back view of the illustrative mobile clean room shown in FIG. 6.

FIG. 7 is a back view of the mobile clean room 140. In this view, four handles 148 are visible, but it will be appreciated that the mobile clean room 140 may include more or less than four handles 148. The mobile clean room 140 includes an overhead region 160 that as shown includes various instruments that pertain to operation of the mobile clean room 140, and in particular pertain to maintaining a desired environment within the mobile clean room 140 in order to meet desired ISO standards. In some cases, the mobile clean room 140 may satisfy ISO 7 standards. In some cases, the mobile clean room 140 may satisfy ISO 6 standards, which are more rigorous than ISO 7 standards. In some cases, the mobile clean room 140 controller (not illustrated) may also be located within the overhead region 160.

The mobile clean room 140 includes an HMI 162, which in some cases may be a touch screen display that is configured to display information as well as to solicit and accept inputs from a user via the touch screen display. In some cases, the HMI 162 may display a variety of status information. The HMI display 162 may display alarm statuses. In some instances, the HMI 162 may be configured to provide audible indications that an alarm status has been reached, for any of a variety of different reasons. An audible indication could include a bell or siren, for example. An audible indication could include a previously recorded error message, or an error message spoken by the mobile clean room controller.

Because the mobile clean room 140 includes an air quality system such as a filtration system and/or a ventilation system, the mobile clean room 140 includes an air outlet 164 that is located at or near the bottom of the enclosure 142. In some cases, a corresponding air inlet may be located within a top surface of the enclosure 142, as will be seen in FIG. 9.

Figure 8:
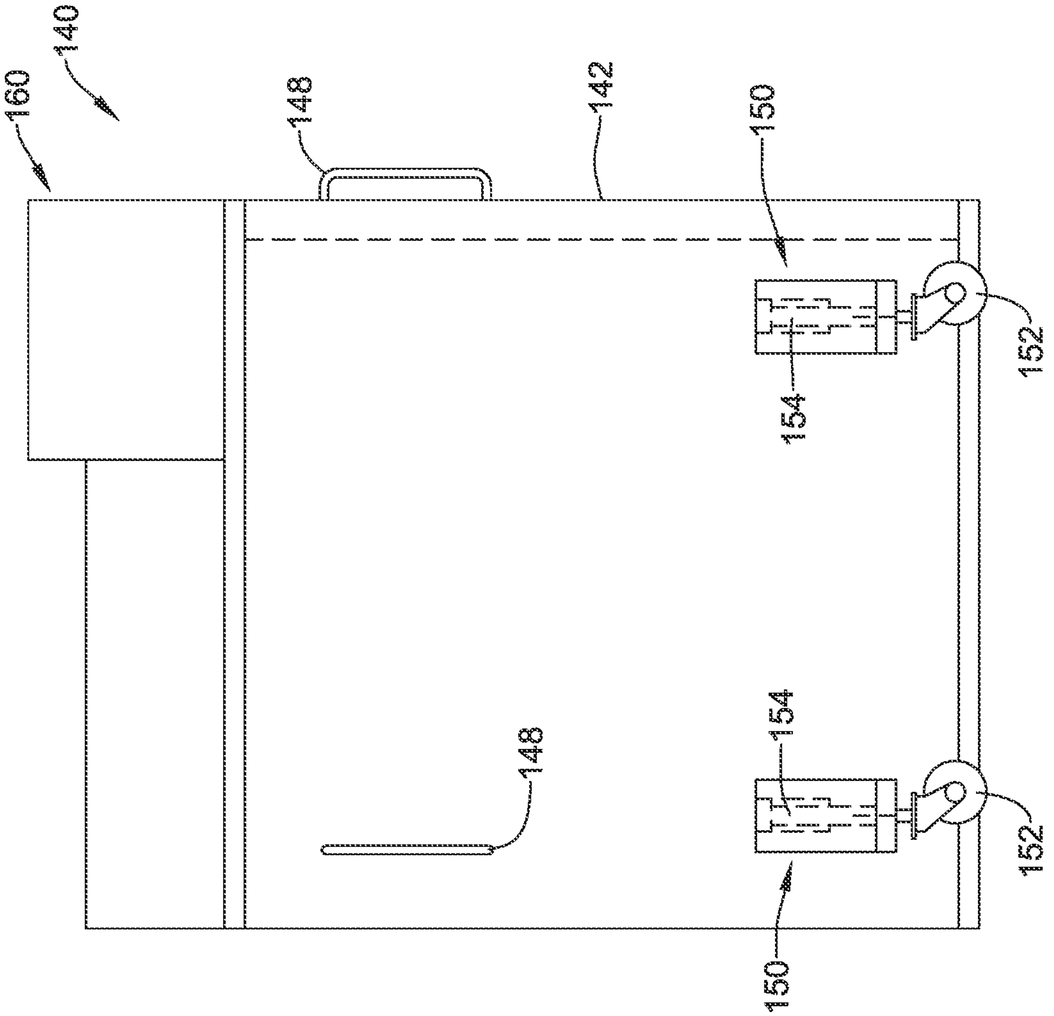
FIG. 8 is a side view of the illustrative mobile clean room shown in FIG. 6.
Figure 9:
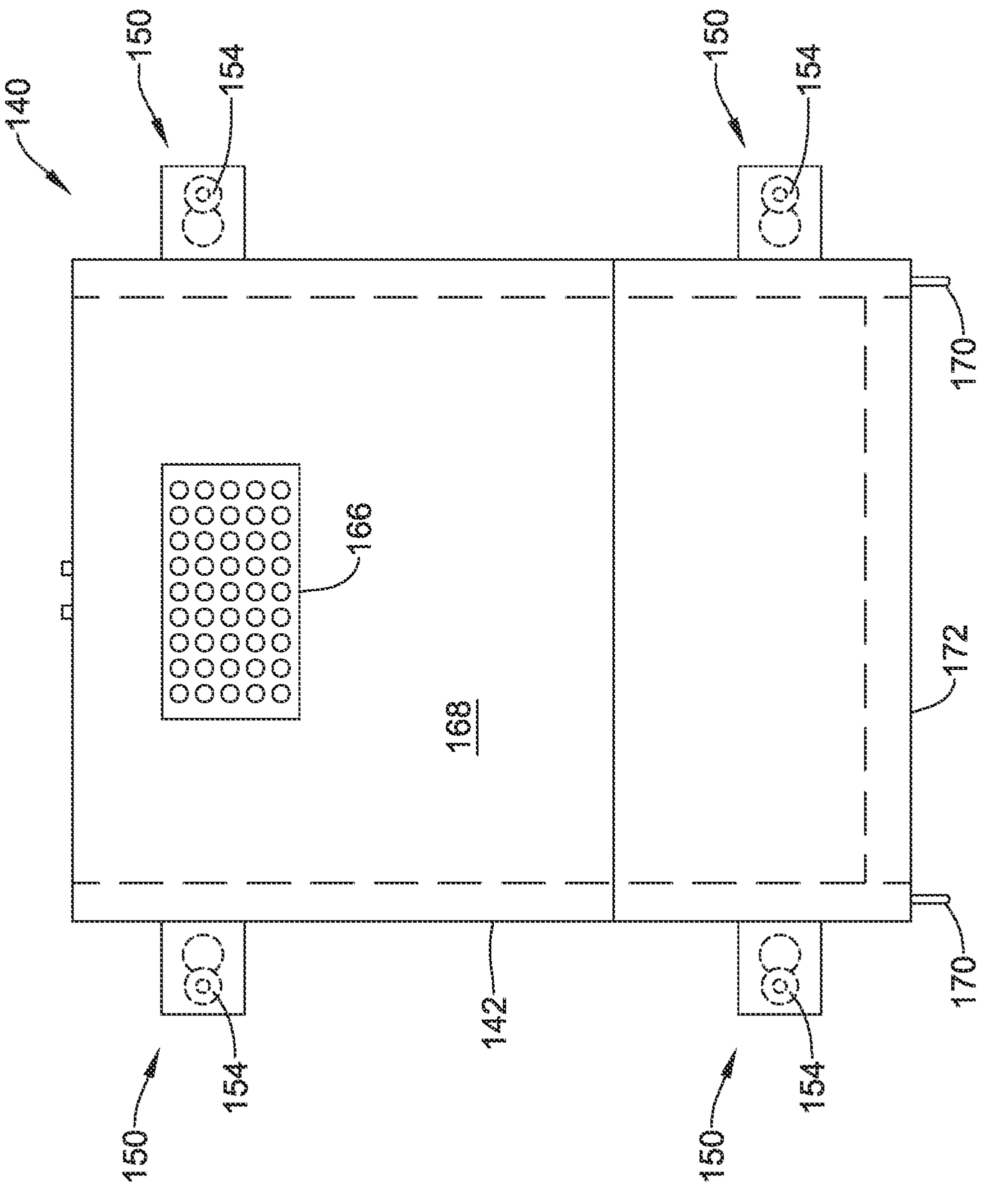
FIG. 9 is a top view of the illustrative mobile clean room shown in FIG. 6.

FIG. 8 is a side view of the mobile clean room 140 and FIG. 9 is a top view of the mobile clean room 140. An air inlet 166 can be seen disposed within a top surface 168 of the enclosure 142. A pair of extensions 170 extend forward from a front face 172 of the enclosure 142 and define the handles 148 that may be used by one or more operators when manually positioning the mobile clean room 84.

Figure 10:
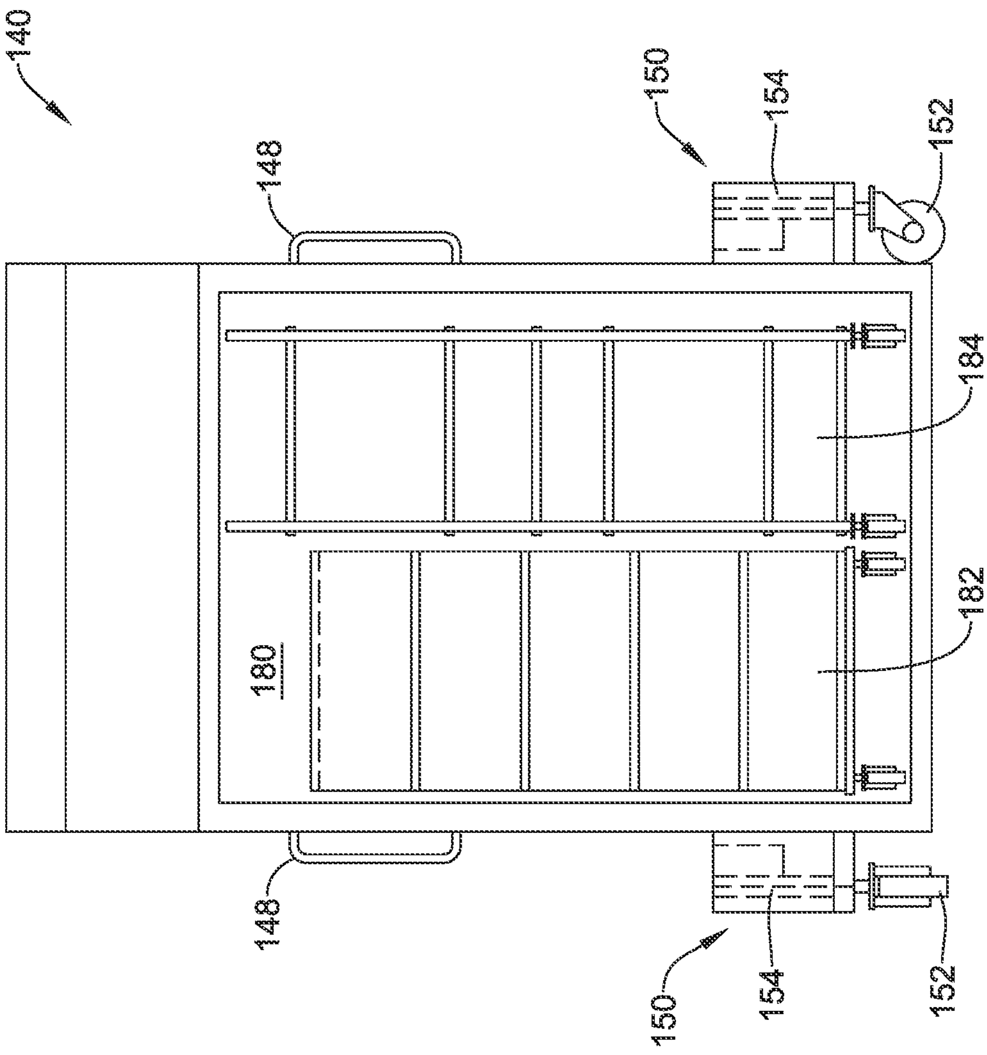
FIG. 10 is a front view of the illustrative mobile clean room shown in FIG. 6, shown with the doors open to illustrate an interior space of the illustrative mobile clean room.

FIG. 10 is a front view of the mobile clean room 140, with the doors 144 and 146 removed to reveal an interior 180 of the mobile clean room 140. As shown, the interior 180 provides sufficient space to accommodate a first rolling cart 182 and a second rolling cart 184. In some cases, the interior 180 may accommodate only one relatively larger cart. In some cases, the interior 180 may accommodate three or more relatively smaller carts. It will be appreciated that these rolling carts 182 and 184 may be easily moved from a stationary clean room into the mobile clean room 140, and into another stationary clean room.

Figure 11:
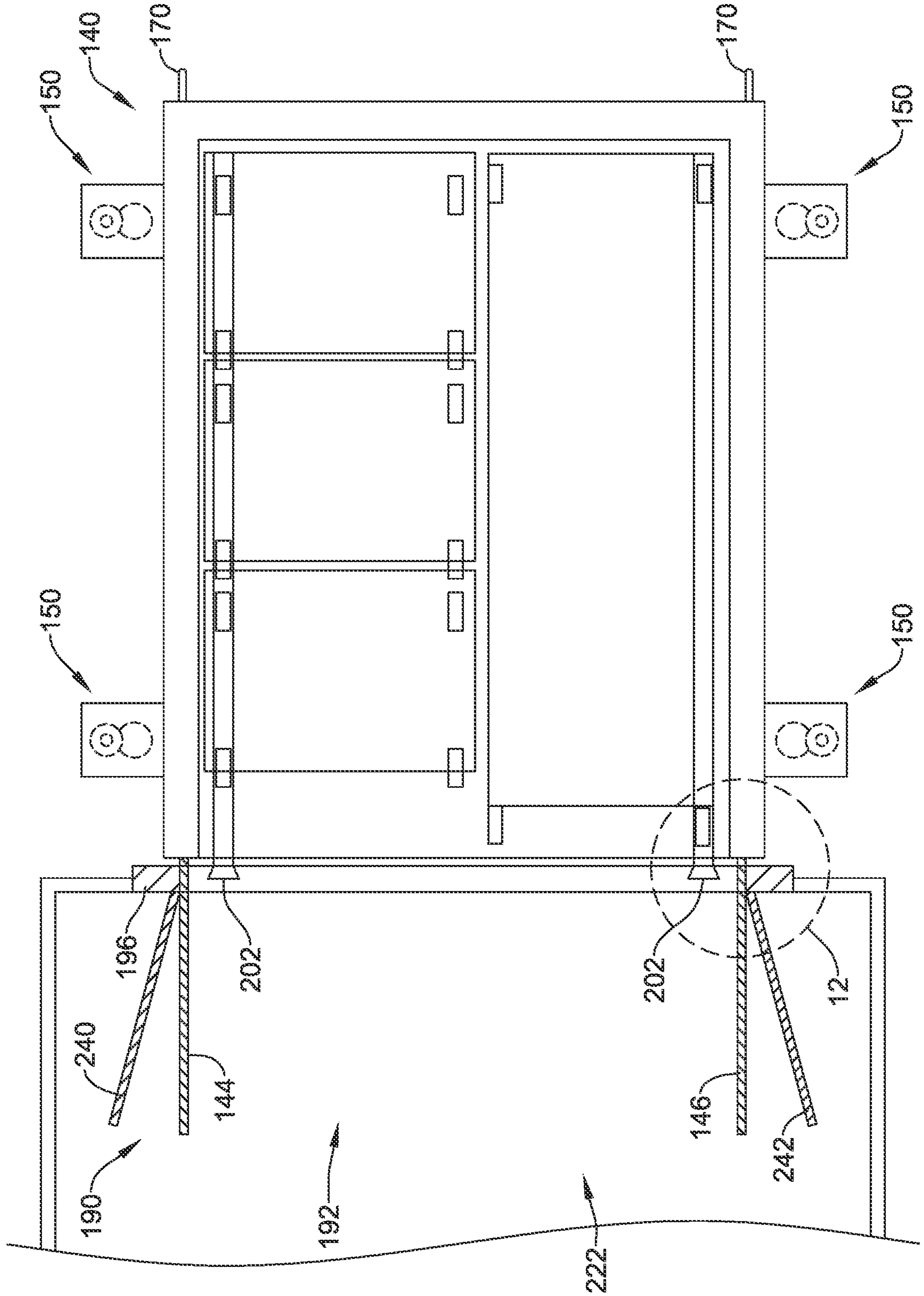
FIG. 11 is a top view showing an illustrative interface between a stationary clean room and the mobile clean room shown in FIG. 6.

FIG. 11 is an overhead view of an illustrative manufacturing system 190 including a portion of a stationary clean room 222 and the mobile clean room 140 positioned proximate the stationary clean room 222. The stationary clean room 222 includes an access region 196, and a pair of clean room doors 240 and 242 that are hingedly secured within the access region 196. As shown, the clean room doors 240 and 242 have been fully opened into the interior 192 of the stationary clean room 222.

Figure 12:
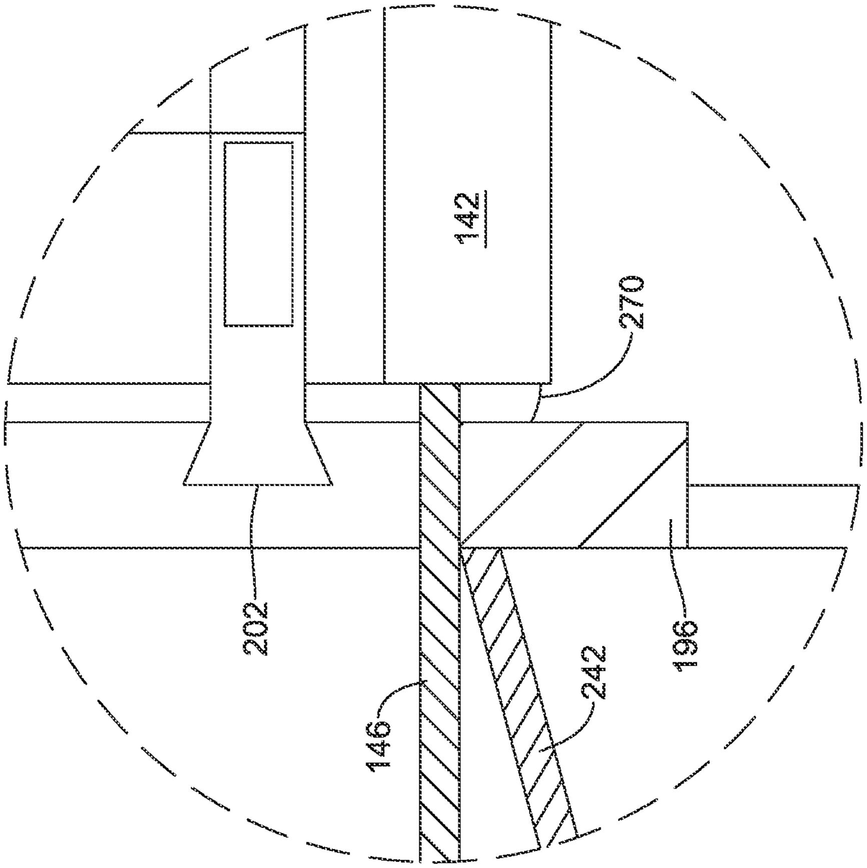
FIG. 12 is an enlarged view of a portion of the illustrative interface shown in FIG. 11.

The mobile clean room 140 includes a pair of rails 202 that extend partially into the access region 196. The rails 202 may be used to help guide carts, shelves, etc. into and out of the mobile clean room 140. FIG. 12 is an enlarged view of a portion of the manufacturing system 190. As can be seen, there is a resilient gasket 270 disposed between the access region 196 (i.e., doorway of the stationary clean room 222) and the enclosure 142 of the mobile clean room 140. In some cases, the resilient gasket 270 is secured to the access region 196. In some cases, the resilient gasket 270 may be secured to the mobile clean room 140. The resilient gasket 270 insures an air tight seal between the access region 196 of the stationary clean room 222 and the enclosure 142 of the mobile clean room 140 such that environmental contamination cannot enter into the sealed off interiors of the stationary clean room 222 and the mobile clean room 140. The resilient gasket 270 may extend around an entire perimeter of the opening between the stationary clean room 222 and the mobile clean room 140.

Figure 13:
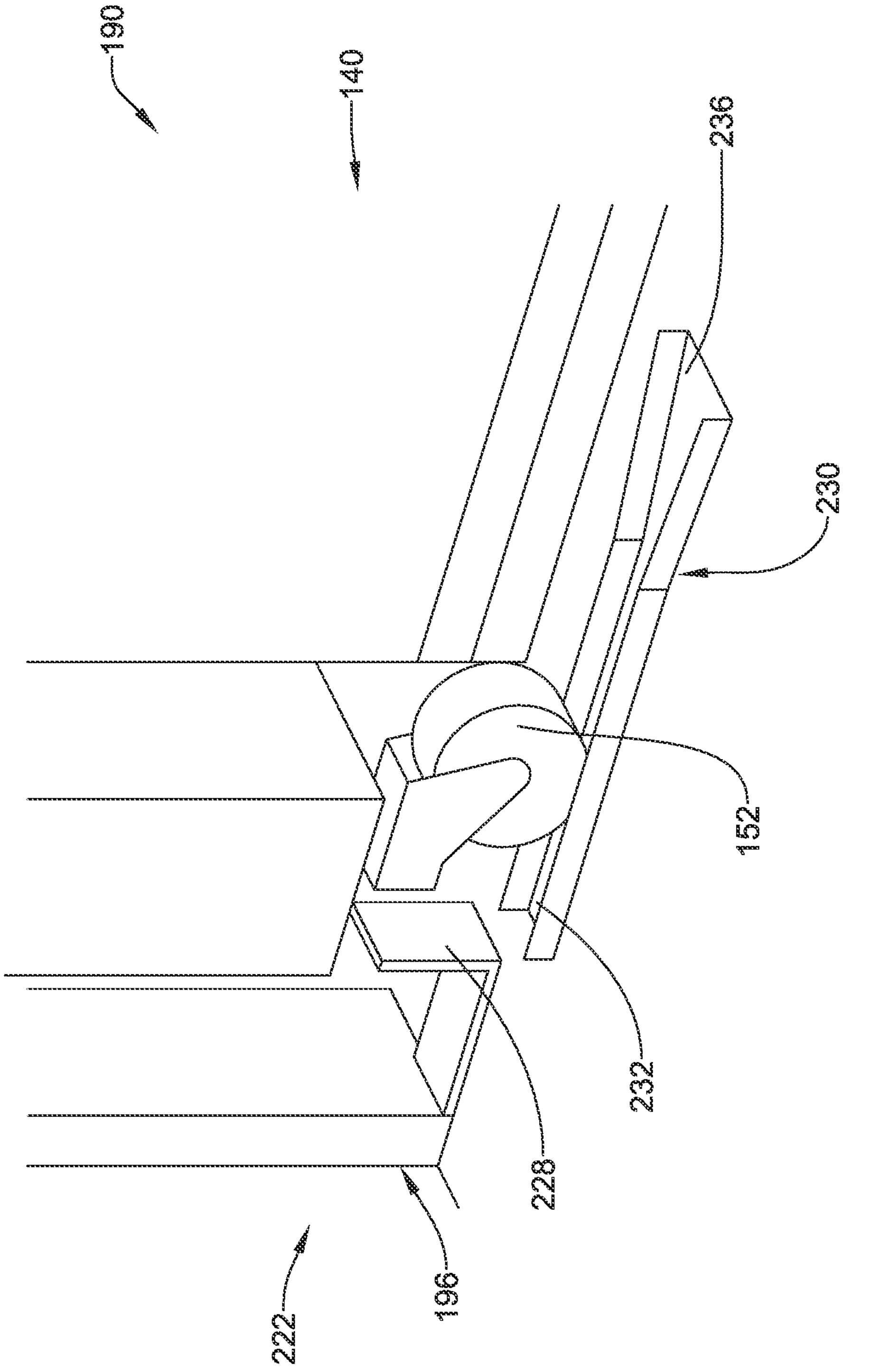
FIG. 13 is a perspective view of a portion of an illustrative manufacturing system including a stationary clean room and a mobile clean room.

FIG. 13 is a perspective view of a portion of the illustrative manufacturing system 190 showing several features. The illustrative manufacturing system 190 includes a portion of the stationary clean room 222 and the mobile clean room 140 positioned proximate the stationary clean room 222. In some cases, as shown, the access region 196 of the stationary clean room 222 includes a physical stop 228 that is secured near the floor. The physical stop 228 is intended to stop the forward progress of the mobile clean room 224 from damaging the stationary clean room 222 by moving too far towards the stationary clean room 222. In some instances, contact with the physical stop 228 may indicate correct positioning of the mobile clean room 224 relative to the stationary clean room 222 to ensure an air-tight seal is attained therebetween.

In some cases, as shown, there may be a guide 230 that is secured relative to the floor near the stationary clean room 222. The guide 230, which may be a U-shaped track or rail, for example, helps to direct the mobile clean room 140 into alignment with the stationary clean room 222, and more particularly, with the access region 196 thereof. The guide 230, which may be formed of steel or aluminum and bolted to the floor, for example, may have an enlarged opening 236 that allows the guide 230 to capture a wheel 152 of the mobile clean room 140, and then narrows to better guide the wheel 152 into position.

Figure 14:
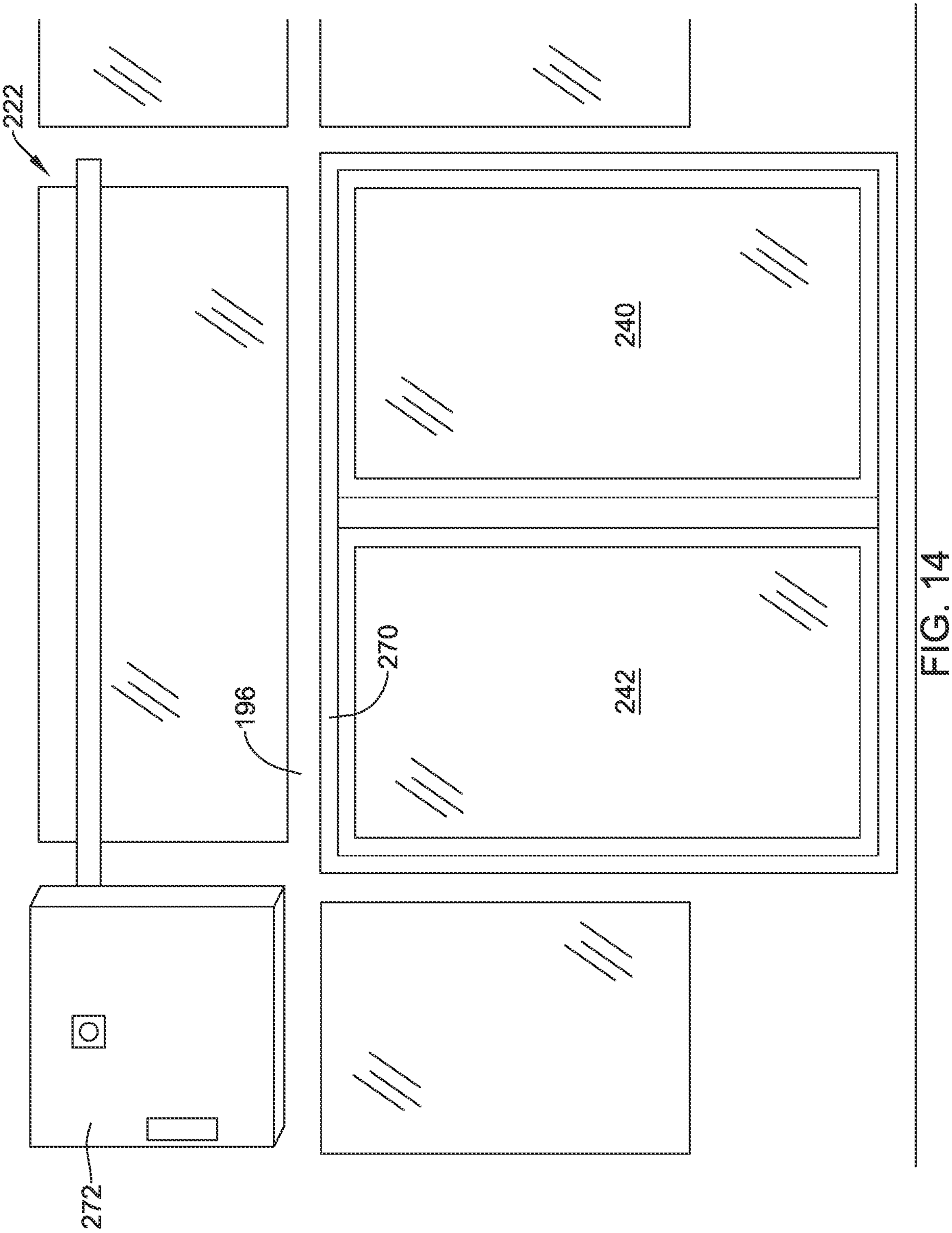
FIG. 14 is a perspective view of a portion of an illustrative manufacturing system including a stationary clean room and a mobile clean room.

FIG. 14 is a view of an exterior of the stationary clean room 222, looking into the stationary clean room 222 from a position outside of the stationary clean room 222, essentially where the mobile clean room 140 would be if positioned proximate the stationary clean room 222. The stationary clean room 222 includes an access region 196 having an opening or doorway including a door 240 and a door 242 for accessing the interior of the stationary clean room 222. The doors 240/242 are shown in a closed position in FIG. 14. The stationary clean room 222 includes a resilient gasket 270 that extends around the access region 196 (e.g., extends around the doorway or opening into the stationary clean room 222). The resilient gasket 270 is configured to form a seal around the doorway or access region 196 when the mobile clean room 140 is docked with the stationary clean room 222, as described further herein. FIG. 14 also shows an enclosure 272 that in some instances may include the stationary clean room controller in communication with one or more sensors as described herein.

Figure 15:
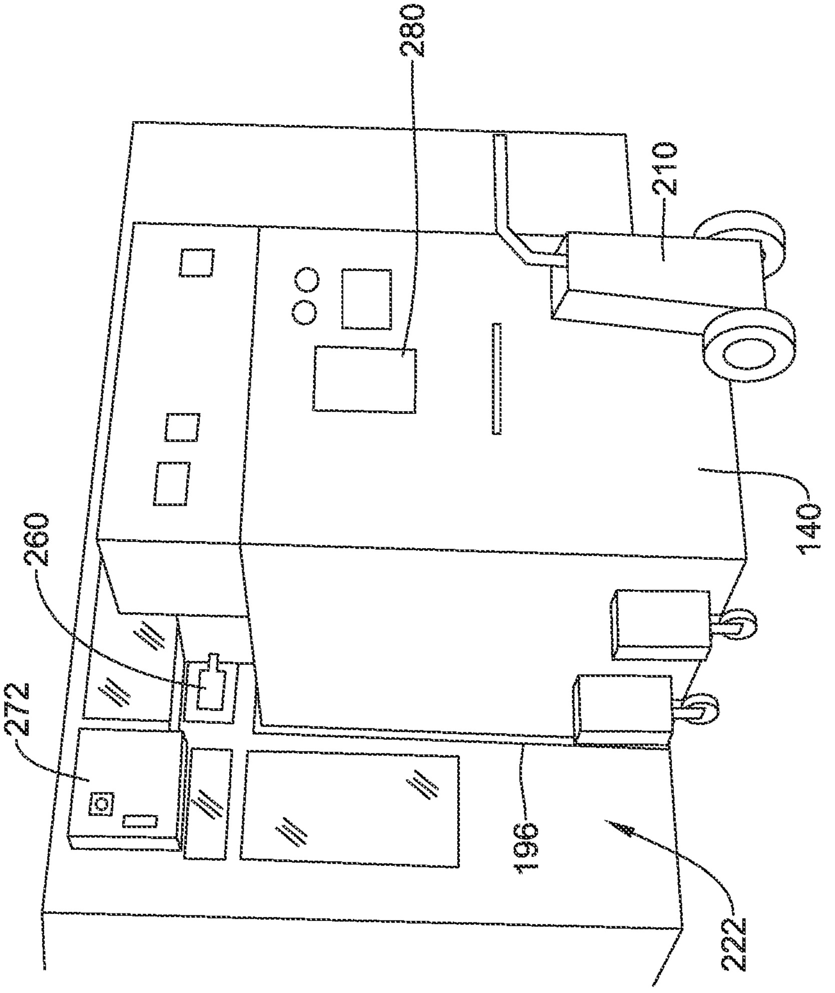
FIG. 15 is a perspective view of a portion of an illustrative manufacturing system including a stationary clean room and a mobile clean room.

FIG. 15 is a view of the exterior of the stationary clean room 222 with the mobile clean room 140 docked up to the access region 196. As shown in FIG. 15, the doors of the mobile clean room 140 may be aligned with the doors 240/242 of the stationary clean room 222 such that the interior of the mobile clean room 140 is accessible from the interior of the stationary clean room 222. As shown in FIG. 15, an electric tractor 210, which may essentially take the form of a pallet jack or a pallet truck, may be used to move the mobile clean room 140 into position to be docked with the access region 196 of the stationary clean room 22 and/or move the mobile clean room 140 away from the access region 196 of the stationary clean room 222.

Figure 16:
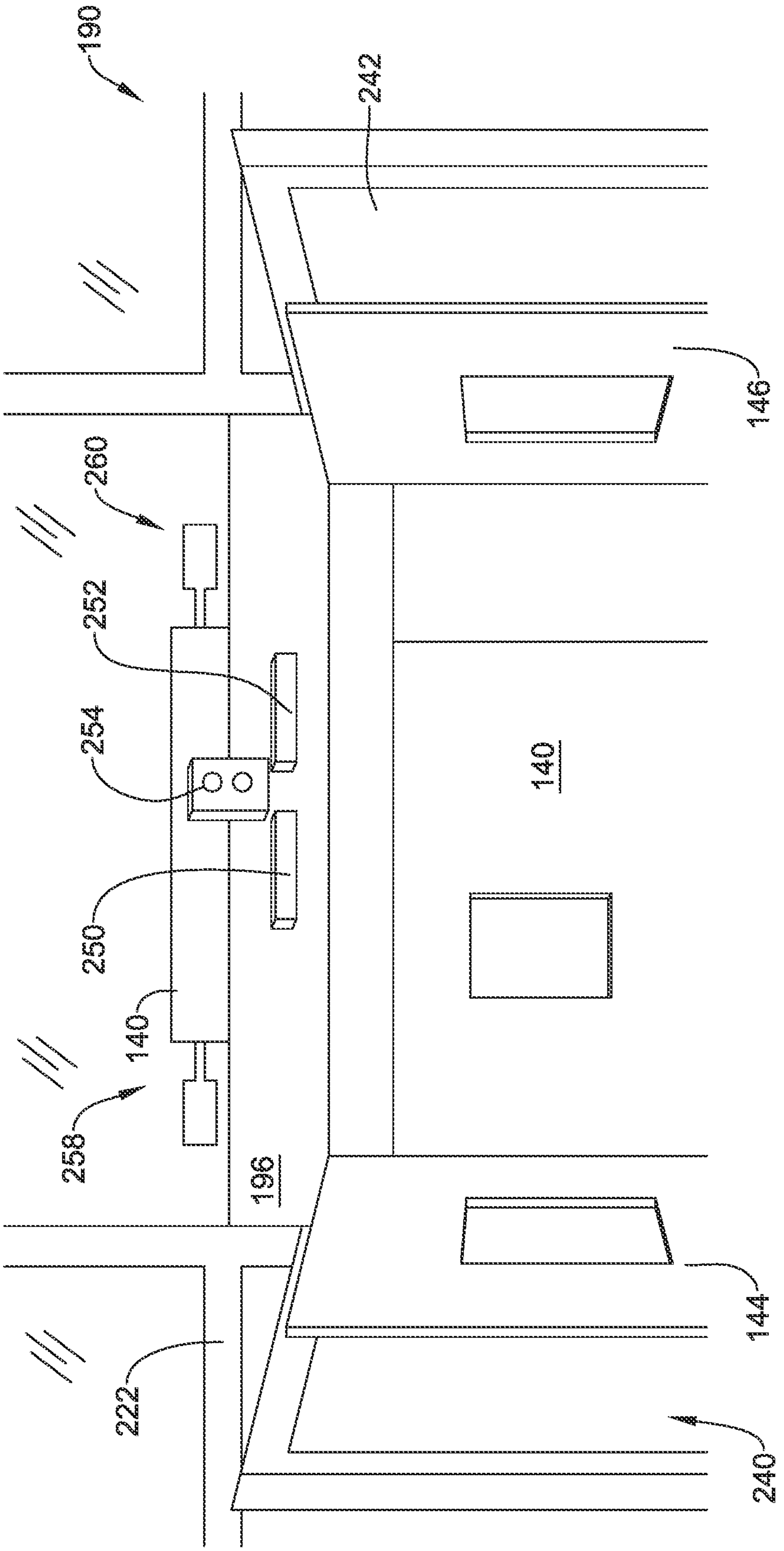
FIG. 16 is a perspective view of a portion of an illustrative manufacturing system including a stationary clean room and a mobile clean room.

FIG. 16 is another view of the illustrative manufacturing system 190, looking into the mobile clean room 140 from the stationary clean room 222 with the mobile clean room 140 docked with the stationary clean room 222 and both doors 240/242 of the mobile clean room 140 have been opened. The mobile clean room 140 includes a door 144 and a door 146, both of which have also been opened. Both the doors 240/242 of the stationary clean room 222, as well as both the doors 144/146 of the mobile clean room 140 open into the interior of the stationary clean room 222.

As seen in FIG. 16, the stationary clean room 222 also includes a first mobile clean room detection sensor 258 and a second mobile clean room detection sensor 260. The first mobile clean room detection sensor 258 and the second mobile clean room detection sensor 260, which may be optical or laser sensors, are actually located on an exterior wall of the stationary clean room 222, and are visible in FIG. 16 through a glass panel forming a portion of that exterior wall. Each of the first mobile clean room detection sensor 258 and the second mobile clean room detection sensor 260 are configured to ascertain whether the mobile clean room 140 is properly positioned proximate the access region 196. Both sensors 258 and 260 are configured to detect the presence (or lack thereof) of the mobile clean room 140. The sensors 258 and 260 may be optical or laser sensors, with an optical or laser beam extending therebetween. In other instances, the sensor 258 may emit an optical or laser beam while the sensor 260 may detect the optical or laser beam, or vice versa. When the mobile clean room 140 is lowered to the ground, the light beam is interrupted and thus the sensors 258 and 260 are able to confirm the proper positioning of the mobile clean room 140. The sensors 258 and 260 include a visual alarm, which can illuminate either a red light or a green light, depending on the relative position of the mobile clean room 140. The sensors 258/260 may be communicatively coupled to components within the enclosure 272 and/or the mobile clean room controller, which may be provided with the mobile clean room 140, that controls operation of the mobile clean room 140, for example.

Above the access region 196 in which the doors 240 and 242 are located, a pair of door sensors 250 and 252 are positioned to determine whether the doors 240 and 242 are open or closed (or unlocked or locked). The door sensor 250 is configured to output a signal indicating whether the door 240 is open or closed (or unlocked or locked), and the door sensor 252 is configured to output a signal indicating whether the door 242 is open or closed (or unlocked or locked). The door sensors 250 and 252 are connected to a visual alarm 254, which can illuminate either a red light or a green light, depending on the door status, for example. The sensors 250/252 may be communicatively coupled to components within the enclosure 272 and/or the mobile clean room controller, which may be provided with the mobile clean room 140, that controls operation of the mobile clean room 140, for example.

Figure 17:
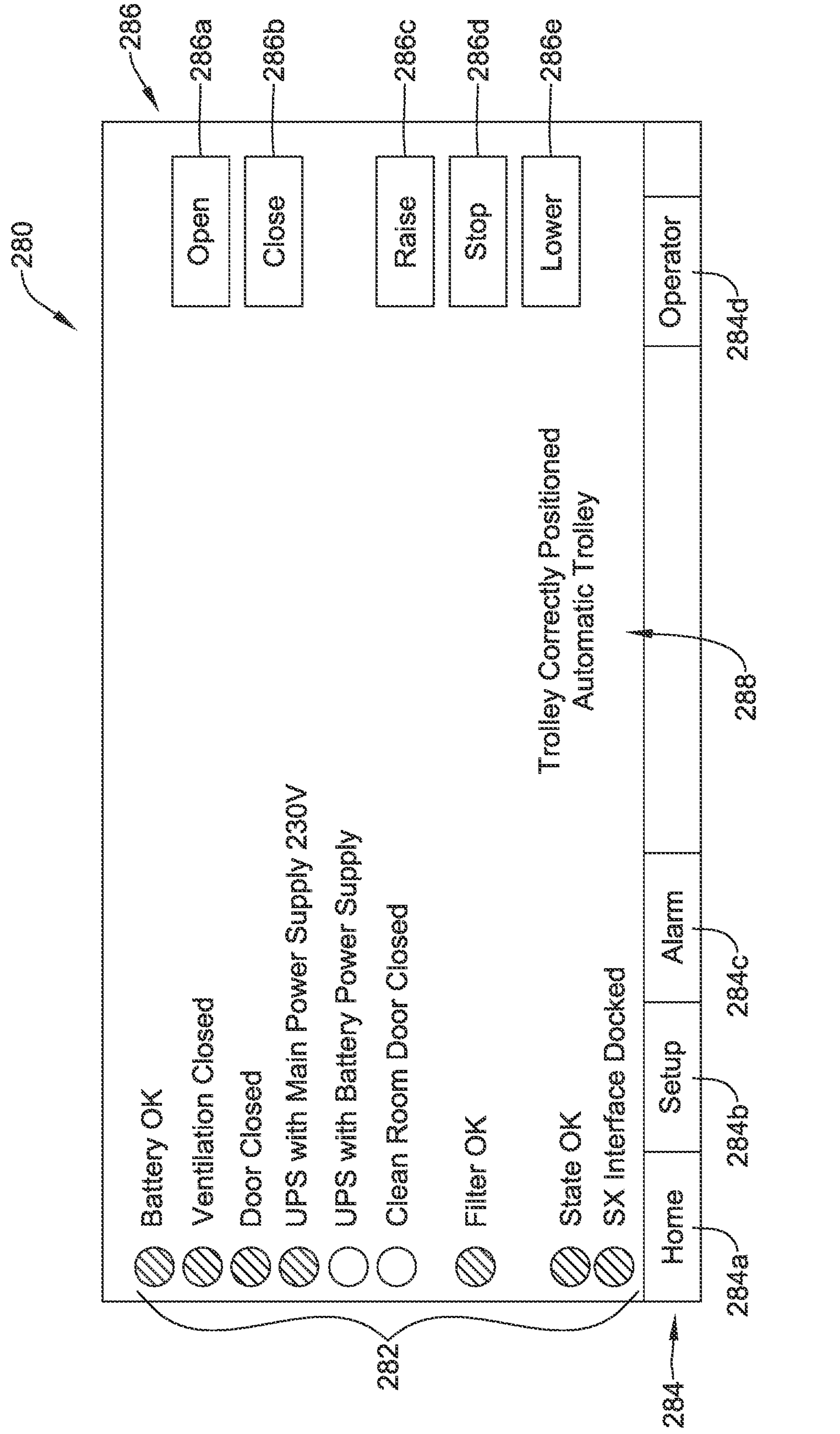
FIG. 17 is a view of an illustrative human machine interface (HMI) forming a part of an illustrative mobile clean room.

FIG. 17 is a view of an illustrative display 280 that may be displayed by an HMI forming part of the mobile clean room 140, shown in FIG. 15. The display 280 includes an information section 282 that includes information regarding battery status, filter status, UPS (uninterruptible power supply) status and others. The information section 282 includes green lights for those statuses that are within range and are viewed as good. Some are not illuminated, meaning that perhaps they are not relevant. It will be appreciated that if there is an alarm, one or more of the green lights within the information section 282 may glow in a different colored light, such as for example red, in order to draw the attention of a user to the alarm status.

The display 280 includes a series of buttons 284 across the bottom of the display 280, including a HOME button **284*a*, a SETUP button 284*b*, an ALARMS button 286*c* and an Operator button 286*d*. The HOME button 284*a* may be selected to reach a home screen, for example. The SETUP button 284*b* may be selected to reach one or more setup menus. The ALARMS button 286*c* may be selected in order to view any alarms, for example, or to reach a screen at which the user can cancel or silence an alarm. The Operator button 286*d*** may, if pressed, allow a user to reach a place where they can update their username, change their password, and the like.

The display 280 includes a series of buttons 286 across the right side of the display 280, including an OPEN button **286*a*, a CLOSE button 286*b* (which seems to be currently selected), a RAISE button 286*c*, a STOP button 286*d* and a LOWER button 286*e*. The RAISE button 286*c* and the LOWER button 286*e* may be used, as appropriate, to raise or lower a value of a particular set point or threshold. The display 280 also includes a general status notice 288 that is displayed within a center portion of the display 280**.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The scope of the present disclosure is, of course, defined in the language in which the appended claims are expressed.

What is claimed is:

1. A manufacturing system, comprising:

a mobile clean room including:

a mobile clean room interior volume;

wheels moveable between an extended position and a retracted position; and an electric tractor releasably securable to the mobile clean room, the electric tractor configured to move the mobile clean room when the electric tractor is secured to the mobile clean room and the wheels are in the extended position;

a first clean room including:

a first clean room interior volume;

a first access region providing access to the first clean room interior volume, the mobile clean room configured to dock with the first access region;

one or more first doors disposed within the first access region, the one or more first doors configured to move between a closed position preventing access to the first clean room interior volume through the one or more first doors and an open position permitting access to the first clean room interior volume through the one or more first doors, each of the one or more first doors including a first door lock;

a first mobile clean room detection sensor configured to provide a signal indicating whether the mobile clean room is in position relative to the first access region; and a first clean room controller that is configured to:

receive the signal from the first mobile clean room detection sensor;

send a signal to unlock the first door locks when the signal from the first mobile clean room detection sensor indicates that the mobile clean room is in position relative to the first access region; and not send a signal to unlock the first door locks when the signal from the first mobile clean room detection sensor indicates that the mobile clean room is not in position relative to the first access region.

2. The manufacturing system of claim 1, wherein the first mobile clean room detection sensor comprises a pair of first mobile clean room detection sensors, and the first clean room controller only sends a signal to unlock the first door locks when the signals from both first mobile clean room detection sensors indicate that the mobile clean room is in position relative to the first access region.

3. The manufacturing system of claim 1, further comprising a second clean room, the second clean room including:

a second clean room interior volume;

a second access region providing access to the second clean room interior volume, the mobile clean room configured to dock with the second access region;

one or more second doors disposed within the second access region, the one or more second doors configured to move between a closed position preventing access to the second clean room interior volume through the one or more second doors and an open position permitting access to the second clean room interior volume through the one or more second doors, each of the one or more second doors including a second door lock;

a second mobile clean room detection sensor configured to provide a signal indicating whether the mobile clean room is in position relative to the second access region; and a second clean room controller that is configured to:

receive the signal from the second mobile clean room detection sensor;

send a signal to unlock the second door locks when the signal from the second mobile clean room detection sensor indicates that the mobile clean room is in position relative to the second access region; and not send a signal to unlock the second door locks when the signal from the second mobile clean room detection sensor indicates that the mobile clean room is not in position relative to the second access region.

4. The manufacturing system of claim 3, wherein the electric tractor is configured to move the mobile clean room between the first access region and second access region.

5. The manufacturing system of claim 1, wherein the mobile clean room further comprises a mobile clean room controller that is configured to communicate with the first clean room controller.

6. The manufacturing system of claim 5, further comprising a first door sensor dedicated to each of the one or more first doors, each first door sensor outputting a signal indicating whether a corresponding first door is in an open position or a closed position.

7. The manufacturing system of claim 6, wherein the mobile clean room controller is configured to:

receive a signal from each first door sensor indicating whether each of the one or more first doors is in the open position or in the closed position;

when the signal from each first door sensor indicates that at least one of the one or more first doors is in the open position, the mobile clean room controller outputs a tractor command preventing the electric tractor from moving the mobile clean room away from the first access region; and when the signal from each first door sensor indicates that each of the one or more first doors are in the closed position, the mobile clean room controller outputs a tractor command permitting the electric tractor to move the mobile clean room away from the first access region.

8. The manufacturing system of claim 7, wherein the mobile clean room controller is further configured to send a signal informing the first clean room controller that the electric tractor is permitted to move the mobile clean room away from the first access region, and the first clean room controller is configured to send sends a signal to lock the first door locks in response to the signal informing the first clean room controller that the electric tractor is permitted to move the mobile clean room away from the first access region.

9. The manufacturing system of claim 7, wherein:

when the signal from each first door sensor indicates that at least one of the one or more first doors is in the open position, the mobile clean room controller outputs a wheels command preventing the wheels from being moved into the extended position; and when the signal from each first door sensor indicates that each of the one or more first doors are in the closed position, the mobile clean room controller outputs a wheels command enabling the wheels being moved into the extended position.

10. The manufacturing system of claim 9, wherein the mobile clean room controller is configured to receive the signals from each first door sensor directly from the first door sensor.

11. A mobile clean room configured to provide a clean room environment while moving components between a first stationary clean room and a second stationary clean room, the mobile clean room comprising:

an interior volume;

an on-board power supply;

an electric tractor coupled to the mobile clean room, the electric tractor configured to move the mobile clean room;

an air quality system configured to maintain a clean room environment within the interior volume; and a controller operably coupled with a filtration system and the on-board power supply, the controller configured to:

monitor and control performance of the air quality system;

monitor performance of the on-board power supply; and communicate with a stationary controller controlling operation of the first stationary clean room and/or the second stationary clean room.

12. The mobile clean room of claim 11, wherein the stationary controller comprises a first stationary controller controlling operation of the first stationary clean room and a second stationary controller controlling operation of the second stationary clean room.

13. The mobile clean room of claim 11, further comprising extendable wheels that are moveable between an extended position and a retracted position in response to a command from the controller.

14. The mobile clean room of claim 13, wherein the controller is configured to provide a command to prevent the extendable wheels from being moved into the extended position or to enable the extendable wheels to be moved into the extended position in response to a signal to do so from the stationary controller;

wherein when the signals from each first door sensor indicate that at least one of the one or more first doors is in the open position, the mobile clean room controller outputs a wheels command preventing the extendable wheels from being moved into the extended position; and wherein when the signals from each first door sensors indicate that each of the one or more first doors are in the closed position, the mobile clean room controller outputs a wheels command enabling the extendable wheels being moved into the extended position.

15. The mobile clean room of claim 11, further comprising a human machine interface (HMI) that is operably coupled with the controller, wherein the HMI is configured to display information determined by the controller or received from the stationary controller.

16. The mobile clean room of claim 15, wherein the HMI is configured to display one or more of:

a status of on-board power supply;

a status of the air quality system including filtration status and/or ventilation status;

an open/closed door status of a door providing access to the interior volume of the mobile clean room;

whether the mobile clean room is positioned correctly or not;

whether either the first stationary clean room or the second stationary clean room is prepared to accept the mobile clean room or to allow the mobile clean room to depart; and whether there are any current alarms.

17. The mobile clean room of claim 13, wherein the HMI is configured to allow a user to enter information for the controller.

18. A method of moving components from a first clean room having a first access region with a first door to a second clean room having a second access region with a second door, the components arranged on one or more moveable carts disposed within the first clean room, the method comprising:

moving a mobile clean room to a position proximate the first access region, the mobile clean room including a mobile clean room door;

confirming that the mobile clean room is appropriately positioned relative to the first access region;

sequentially opening the first door and then the mobile clean room door;

moving the one or more moveable carts from inside the first clean room into the mobile clean room;

sequentially closing the mobile clean room door and then the first door;

confirming that the mobile clean room door and the first door are both closed;

moving the mobile clean room to a position proximate the second access region;

confirming that the mobile clean room is appropriately positioned relative to the second access region;

sequentially opening the second door and then the mobile clean room door; and moving the one or more moveable carts from inside the mobile clean room into the second stationary clean room.

19. The method of claim 18, wherein the mobile clean room comprises extendable wheels moveable between an extended position for moving the mobile clean room and a retracted position, and moving the mobile clean room into a position proximate either the first access region or the second access region comprises:

moving the extendable wheels into the extended position before moving the mobile clean room into the position proximate either the first access region or the second access region; and moving the extendable wheels into the retracted position after moving the mobile clean room into the position proximate either the first access region or the second access region.

20. The method of claim 18, wherein confirming that the mobile clean room door and the first door are both closed comprises receiving confirmation from a stationary clean room door sensor configured to indicate whether the first door is open or closed.

* * * * *